(12) United States Patent
Nagaoka et al.

(10) Patent No.: US 9,073,043 B2
(45) Date of Patent: Jul. 7, 2015

(54) HYDROGEN PRODUCTION CATALYST, PRODUCTION METHOD OF THE SAME AND HYDROGEN PRODUCTION METHOD

(75) Inventors: Katutoshi Nagaoka, Oita (JP); Yuusaku Takita, Oita (JP); Katutoshi Satou, Oita (JP); Hiroyasu Nishiguti, Oita (JP)

(73) Assignee: National University Corporation Oita University (JP)

(*) Notice: Subject to any disclaimer, the term of this patent is extended or adjusted under 35 U.S.C. 154(b) by 1283 days.

(21) Appl. No.: 12/675,716

(22) PCT Filed: Nov. 19, 2007

(86) PCT No.: PCT/JP2007/072395
§ 371 (c)(1),
(2), (4) Date: Feb. 26, 2010

(87) PCT Pub. No.: WO2009/028113
PCT Pub. Date: Mar. 5, 2009

(65) Prior Publication Data
US 2010/0303712 A1 Dec. 2, 2010

(30) Foreign Application Priority Data
Aug. 29, 2007 (JP) ................................. 2007-222834

(51) Int. Cl.
*C01B 3/26* (2006.01)
*B01J 23/63* (2006.01)
(Continued)

(52) U.S. Cl.
CPC ................ *B01J 23/63* (2013.01); *B01J 23/002* (2013.01); *B01J 23/10* (2013.01); *B01J 23/83* (2013.01);
(Continued)

(58) Field of Classification Search
None
See application file for complete search history.

(56) References Cited

U.S. PATENT DOCUMENTS 6,936,567 B2 * 8/2005 Ueda et al. ..................... 502/316
7,223,716 B1 * 5/2007 Koike et al. ................... 502/439
(Continued)

FOREIGN PATENT DOCUMENTS

JP 49083684 A * 8/1974
JP 2002-336702 11/2002
(Continued)

OTHER PUBLICATIONS

Williams et al. "Catalytic autoignition of higher alkane partial oxidation on Rh-coated foams." *Applied Catalysis A: General*. vol. 299. 2006. pp. 30-45.

*Primary Examiner* — Melissa Swain
(74) *Attorney, Agent, or Firm* — Merchant & Gould P.C.

(57) ABSTRACT

The drive of direct-heat-supply type reforming of hydrocarbon at ordinary temperature is necessary in order to realize a self-sustaining, on-site reforming type fuel cell system which does not necessitate the supply of energy from the outside. According to the invention, an oxide, $CeO_2$ or $Pr_6O_{11}$, or a Ce/Zr or Ce/Zr/Y double oxide is used as the oxide containing a rare earth element capable of changing the oxidation number with an active metal and oxygen defects are introduced into the oxide or double oxide by activating the oxide or double oxide with a reducing gas at high temperature. When a reaction gas containing hydrocarbon and oxygen is passed though the catalyst at low temperature, the oxygen defects react with oxygen and thereby return to the original oxide. Since this return reaction is an exothermic reaction, the catalyst itself is heated, which acts as the driving force for advancing the combustion of the hydrocarbon, whereby the catalyst layer is further heated and the reforming is advanced to from hydrogen. Thus, the hydrogen-producing reaction can be driven even at low temperature, particularly ordinary temperature.

2 Claims, 5 Drawing Sheets

(51) Int. Cl.
  *B01J 23/00* (2006.01)
  *B01J 23/10* (2006.01)
  *B01J 23/83* (2006.01)
  *C01B 3/40* (2006.01)
  *H01M 8/06* (2006.01)
  *B01J 37/02* (2006.01)
  *B01J 37/03* (2006.01)
(52) U.S. Cl.
  CPC ............ *B01J 37/0201* (2013.01); *B01J 37/031* (2013.01); *B01J 2523/00* (2013.01); *C01B 3/40* (2013.01); *C01B 2203/0238* (2013.01); *C01B 2203/0261* (2013.01); *C01B 2203/0283* (2013.01); *C01B 2203/1052* (2013.01); *C01B 2203/1058* (2013.01); *C01B 2203/1064* (2013.01); *C01B 2203/107* (2013.01); *C01B 2203/1082* (2013.01); *C01B 2203/1211* (2013.01); *C01B 2203/1217* (2013.01); *C01B 2203/1229* (2013.01); *C01B 2203/1241* (2013.01); *C01B 2203/1247* (2013.01); *C01B 2203/1258* (2013.01); *H01M 8/0618* (2013.01); *Y02E 60/50* (2013.01)

(56) References Cited

U.S. PATENT DOCUMENTS

| | | | |
|---|---|---|---|
| 2003/0060364 | A1 | 3/2003 | Anzai et al. |
| 2004/0092395 | A1* | 5/2004 | Hase et al. .................... 502/439 |
| 2009/0221421 | A1 | 9/2009 | Sagou et al. |

FOREIGN PATENT DOCUMENTS

| | | |
|---|---|---|
| JP | 2005-131469 | 5/2005 |
| JP | 2005-296755 | 10/2005 |
| JP | 2006-167501 | 6/2006 |
| JP | 2006-190605 | 7/2006 |
| JP | 2007-136445 | 6/2007 |

* cited by examiner

HYDROGEN PRODUCTION CATALYST, PRODUCTION METHOD OF THE SAME AND HYDROGEN PRODUCTION METHOD

This application is a National Stage Application of PCT/JP2007/072395, filed 19 Nov. 2007, which claims benefit of Ser. No. 2007-222834, filed 29 Aug. 2007 in Japan and which applications are incorporated herein by reference. To the extent appropriate, a claim of priority is made to each of the above disclosed applications.

TECHNICAL FIELD

The present invention relates to a hydrogen production catalyst that is used to produce hydrogen by a fuel reforming reaction of a hydrocarbon, a method for producing the hydrogen production catalyst, and a method for producing hydrogen using the hydrogen production catalyst.

BACKGROUND ART

There has been a desire in recent years for rapid practical application of clean, highly efficient fuel cell systems in order to solve problems relating to energy and the environment.

In the case of presuming use of a polymer electrolyte fuel cell that operates at low temperatures, the fuel that is used is hydrogen. Consequently, after carrying out a desulfurization procedure as necessary, it is necessary to catalytically reform methane, natural gas consisting mainly of methane, or other hydrocarbons (such as propane gas, liquefied petroleum gas, gasoline, diesel fuel, petroleum or kerosene) for conversion into a product gas containing hydrogen. This process of producing hydrogen by reforming is one of the key steps for increasing the power generation efficiency of fuel cells.

In contrast, solid oxide fuel cells and molten carbonate fuel cells, which operate at moderate and high temperatures, are characterized by allowing hydrocarbons to be used directly. However, in this case as well, a process for reforming the hydrocarbons is frequently still necessary for reasons such as tendency of hydrocarbons to carbon precipitation and the use of hydrogen rather than hydrocarbons facilitating power generation.

Examples of methods for producing hydrogen by reforming hydrocarbons include methods that use a steam reforming reaction, carbonic acid gas reforming reaction and direct heat supply reforming reaction. Among these production methods, the direct heat supply reforming reaction combines an exothermic reaction in the form of perfect combustion with an endothermic reaction in the form of a steam reforming reaction or carbonic acid gas reforming reaction, and consists of, for example, carrying out complete combustion in the first half of the catalyst layer of the reactor, after which the heat generation thereby propagates to the latter half of the catalyst layer of the reactor, thereby promoting the reforming reaction in the form of an endothermic reaction. Consequently, in comparison with the steam reforming reaction and carbonic acid gas reforming reaction that consist of endothermic reactions only, direct heat supply reforming is superior from the viewpoint of reducing the external supply of heat, and the hydrogen formation rate is also extremely fast. On the basis of this background, development is proceeding on hydrogen production catalysts that use direct heat supply reforming of hydrocarbons.

Hydrocarbon reforming reactions have already been industrialized, and in particular steam reforming is employed in a wide range of applications, with the product gas in the form of a synthesis gas ($CO/H_2$) being used in applications such as Fischer-Tropsch synthesis. However, in contrast to operation being continued for long periods of time in conventional applications, there are cases in which the device is frequently started and stopped when assuming application to on-site reforming fuel cell processes. For example, devices can be assumed to only be used in the home during daylight hours or only used in vehicles during driving, while being stopped at all other times. In addition, in the case of off-site reforming such as hydrogen stations as well, the device is only operated during the day. Although it is desirable that electrical power or other form of external energy not be used during starting of the reformer, even in the case of direct heat supply reforming that demonstrates superior hydrogen production even when starting production from low temperatures, it is still necessary to heat the catalyst layer to 200° C. (Patent Document 1 and Non-Patent Document 1). Consequently, electrical power or other external energy must be used when starting the reformer, thereby resulting in problems regarding use in areas not supplied with power and use during disasters. This has also been a considerable problem in terms of realizing fuel cell vehicles loaded with gasoline, gas oil or other liquid fuel.

Patent Document 1: JP 2006-190605 A

Non-Patent Document 1: Kenneth A. Williams and Lanny D. Schmidt, Applied Catalysis A: General 299 (2006) 30-45

DISCLOSURE OF THE INVENTION

Problems to be Solved by the Invention

A temperature of 200° C. or higher has been required to drive direct heat supply reforming reactions of hydrocarbons. Consequently, it was necessary to heat the reformer by supplying external electrical power or the like in order to start up a reformer once it had been completely shut down, and because of this, there have been no completely self-sufficient on-site reforming fuel cell systems that do not require a supply of energy from the outside. In other words, there was the problem of requiring a method for producing hydrogen based on reforming of hydrocarbons, which is operable at normal temperatures, in order to realize self-sufficient fuel cell systems. This invention was completed to solve such problems as described above. First, a catalyst in which oxygen vacancies are introduced into an oxide containing a rare earth element is prepared by carrying out reductive activation treatment at a high temperature on a catalyst precursor that contains an active metal and an oxide containing a rare earth element capable of changing oxygen number. When hydrocarbon and oxygen are passed through this catalyst containing oxygen vacancies at a normal temperature, the oxygen vacancies react with the oxygen resulting in a return to the original oxide. Since this reaction is an exothermic reaction, the catalyst itself is heated. This serves as the driving force for proceeding of the hydrocarbon combustion reaction, causing the catalyst layer to be heated further. Consequently, the reforming reaction proceeds and hydrogen is formed. Thus, a hydrogen production reaction has been clearly demonstrated to be operable at low temperatures, and particularly even at normal temperatures.

As a result of conducting more extensive studies, the inventors of the present invention determined that the use of a catalyst precursor containing an active metal, and a complex oxide of a rare earth element having a valence of +3 or +4 and capable of changing oxygen number and Zr or a complex oxide of Ce, Zr and Y, permits introduction of oxygen vacancies under extremely mild conditions, thereby leading to completion of the present invention.

Means to Solve the Problems The technical means that characterize the present invention are as indicated below.
(1) A hydrogen gas production catalyst containing a support loaded with an active metal having catalytic activity, the catalyst catalyzing a reaction in which hydrogen is formed from a reaction gas containing hydrocarbon and oxygen,
wherein the support retains oxygen lattice defects introduced into $CeO_2$, $Pr_6O_{11}$, a complex oxide of Zr and Ce or a complex oxide of Zr, Y and Ce, and
the oxygen lattice deffects introduced into the support are used in the reaction that forms hydrogen from the reaction gas by using heat generated by reacting with oxygen in the reaction gas.
(2) A hydrogen gas production catalyst containing a support loaded with an active metal having catalytic activity, the catalyst catalyzing a reaction in which hydrogen is formed from a reaction gas containing hydrocarbon and oxygen,
wherein the support retains oxygen lattice defects introduced into a complex oxide of Zr and Ce or a complex oxide of Zr, Y and Ce, and
the oxygen lattice defects introduced into the support are used in the reaction that forms hydrogen and carbon monoxide from the reaction gas by using heat generated by a reaction with oxygen in the reaction gas, while oxygen lattice defects are reintroduced into the support by reducing the support with a portion of the hydrogen and carbon monoxide formed.
(3) A hydrogen gas production catalyst containing a support loaded with an active metal having catalytic activity, the catalyst catalyzing a reaction in which hydrogen is formed from a reaction gas containing hydrocarbon and oxygen,
wherein the support is composed using Ce or Pr, and
a precursor composed of $CeO_2$ or $Pr_6O_{11}$ is obtained by calcining the support in an oxidizing atmosphere and at a prescribed temperature before or after loading the active metal, the resulting precursor is treated in a reducing atmosphere at a prescribed temperature and for a prescribed amount of time, to thereby introduce oxygen lattice defects into the oxide to activate the precursor, and the activated precursor is held in an inert atmosphere so as to retain the introduced oxygen lattice defects.
(4) A hydrogen gas production catalyst containing a support loaded with an active metal having catalytic activity, the catalyst catalyzing a reaction in which hydrogen is formed from a reaction gas containing hydrocarbon and oxygen,
wherein the support is composed using a complex of Zr and Ce or a complex of Zr, Y and Ce, and
a precursor in which the complex is in the form of a complex oxide is obtained by calcining the support in an oxidizing atmosphere and at a prescribed temperature before or after loading the active metal, the resulting precursor is treated in a reducing atmosphere at a prescribed temperature and for a prescribed amount of time, to thereby introduce oxygen lattice defects into the complex oxide to activate the precursor, and the activated precursor is held in an inert atmosphere so as to retain the introduced oxygen lattice defects.
(5) The hydrogen production catalyst described in (1), (2) or (4) above, which is $Rh/Se_xZr_{1-x}O_2$, wherein x is from 0.25 to 0.75, and in which an active metal in the form of Rh is loaded onto a support composed of a complex oxide of Zr and Ce.
(6) A method for producing a hydrogen production catalyst containing a support loaded with an active metal having catalytic activity, the catalyst catalyzing a reaction in which hydrogen is formed from a reaction gas containing hydrocarbon and oxygen,
wherein the support is composed using Ce, Pr, a complex of Cr and Ce or a complex of Zr, Y and Ce; and wherein the method comprises:
a first step for calcining the support in an oxidizing atmosphere and at a prescribed temperature before or after loading the active metal, to thereby obtain a precursor in which the Ce or Pr is made into oxide or the complex is made into a complex oxide,
a second step for treating the resulting precursor in a reducing atmosphere at a prescribed temperature and for a prescribed amount of time, to thereby introduce oxygen lattice defects into the oxide or complex oxide to activate the precursor, and
a third step for retaining the activated precursor in an inert atmosphere.
(7) The production method of a hydrogen production catalyst described in (6) above, wherein as the precursor, $Rh/Ce_xZr_{1-x}O_2$, wherein x is from 0.25 to 0.75, which is composed by loading an active metal in the form of Rh onto a support composed of a complex oxide of Zr and Ce, is used.
(8) The production method of a hydrogen production catalyst described in (7) above, wherein the second step is carried out at an appropriate temperature lower than 200° C.
(9) A hydrogen production method, comprising passing a reaction gas containing hydrocarbon and oxygen through the hydrogen production catalyst described in any of (1) to (5) above, and forming hydrogen from the reaction gas by using the heat generated from the reaction of the oxygen lattice defects introduced into the support composing the hydrogen production catalyst and the oxygen in the reaction gas, to raise the temperature of the hydrogen production catalyst to a prescribed temperature.
(10) The hydrogen production method described in (10) above, wherein hydrogen is formed from the reaction gas by passing the reaction gas through the hydrogen production catalyst at a natural environmental temperature of from −40 to 100° C.
(11) A hydrogen production method, comprising passing a reaction gas containing hydrocarbon and oxygen through the hydrogen production catalyst described in (2), (4) or (5) above, and forming hydrogen and carbon monoxide from the reaction gas by using the heat generated from the reaction of the oxygen lattice defects introduced into the support composing the hydrogen production catalyst and the oxygen in the reaction gas, to raise the temperature of the hydrogen production catalyst to a prescribed temperature, while reintroducing oxygen lattice defects into the support by reducing the support with a portion of the hydrogen and carbon monoxide formed.
(12) The hydrogen production method described in (11) above, wherein hydrogen is formed from the reaction gas and oxygen lattice defects are reintroduced into the support by passing the reaction gas through the hydrogen production catalyst at a natural environmental temperature of from −40 to 100° C.
(13) The hydrogen production method described in (11) or (12) above, wherein a hydrogen production catalyst, in which the active metal is loaded into a support composed by introducing oxygen lattice defects onto $CeO_2$, is used instead of the hydrogen production catalyst described in (2), (4) or (5) above, and the surrounding of the hydrogen production catalyst is insulated, and in this condition, hydrogen is formed from the reaction gas and oxygen lattice defects are reintroduced into the support.

(14) The hydrogen production method described in any of (11) to (13) above, wherein the flow of reaction gas to the hydrogen production catalyst is stopped, and the flow of reaction gas to the hydrogen production catalyst is then resumed to form hydrogen from the reaction gas and reintroduce oxygen lattice defects into the support.

(15) The hydrogen production method described in any of (9) to (14) above, wherein the hydrocarbon in the reaction gas is combusted by heat generated by allowing oxygen lattice defects introduced into the support to react with oxygen in the reaction gas, and using this heat of combustion to raise the temperature of the hydrogen production catalyst to a prescribed temperature.

EFFECTS OF THE INVENTION

A hydrogen production reaction by direct heat supply reforming, which was conventionally operable at temperatures of 200° C. or higher, is operable at normal temperatures according to the present invention. Moreover, a catalyst was also found that enables repeated operation at normal temperatures without carrying out pretreatment at high temperatures.

DESCRIPTION OF REFERENCE SYMBOLS

Figure 2:
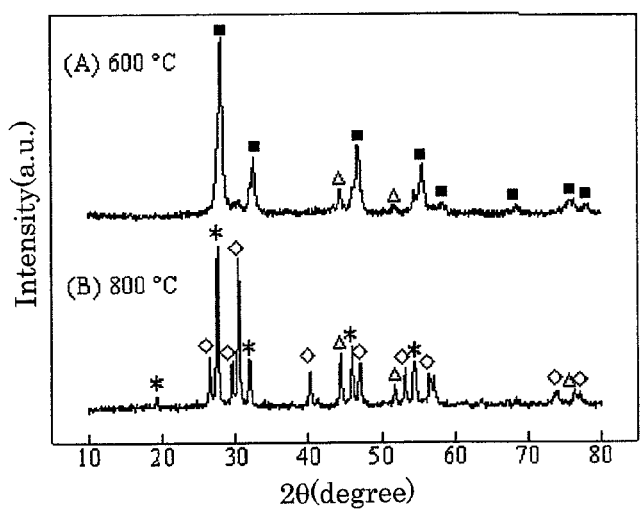
FIG. 2 shows XRD patterns following reduction of Catalyst Precursor Preparation Example 4 at 600° C. (A) and 800° C. (B).
Figure 3:
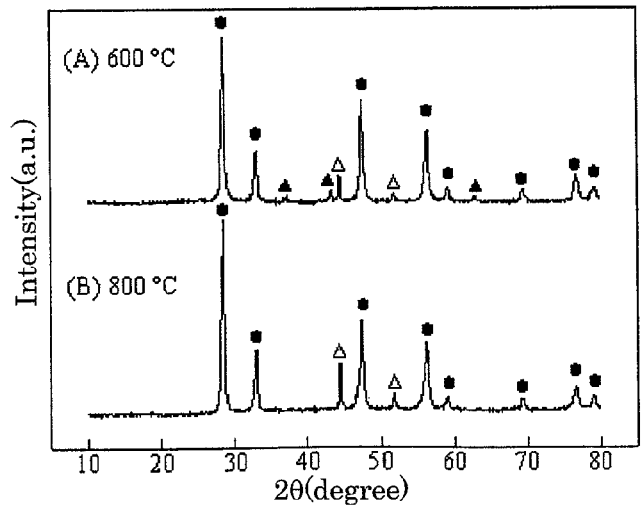
FIG. 3 shows XRD patterns following reduction of Catalyst Precursor Preparation Example 1 at 600° C. (A) and 800° C. (B).

FIG. 2 (■) $Pr_6O_{11}$, (◇) $Pr_2O_3$, (Δ) metal Ni, (*) unknown
FIG. 3 (●) $CeO_2$, (▲) NiO, (Δ) metal Ni

BEST MODE FOR CARRYING OUT THE INVENTION

The low-temperature hydrogen production catalyst of the present invention refers to a catalyst in which oxygen vacancies are introduced into a so-called catalyst precursor composed of one or more active metals and an oxide containing a rare earth element capable of changing oxygen number for the support thereof.

Production of the low-temperature hydrogen production catalyst of the present invention consists of introducing oxygen vacancies by carrying out activation treatment with a reducing gas at a high temperature on the aforementioned catalyst precursor.

In addition, the present invention relates to the development of a method for producing hydrogen using a catalyst in which oxygen vacancies have been introduced, the catalyst being characterized by the oxygen vacancies reacting with hydrogen even at normal temperatures when a reaction gas containing hydrocarbon and oxygen is passed therethrough.

Examples of this reaction include Formula 1: $CeO_{2-x}+0.5xO_2 \rightarrow CeO_2$ and Formula 2: $Pr_6O_{11-y}+0.5yO_2 \rightarrow Pr_6O_{11}$. Since this reaction is an exothermic reaction, the heat serves as the driving force enabling the hydrocarbon combustion reaction of Formula 3 to proceed.

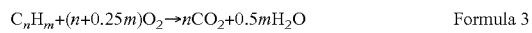
$C_nH_m+(n+0.25m)O_2 \rightarrow nCO_2+0.5mH_2O$  Formula 3

As a result, the catalyst layer is heated further. Furthermore, generation of heat occurs due to similar oxidation of $Ce^{3+}$ or $Pr^{3+}$ and the like even in the case of complex oxides with Zr, Y and the like. When a temperature is reached that enables the reforming reaction to proceed in equilibrium, this method enables hydrogen to be produced starting from a low temperature in which hydrogen is formed according to the reforming reactions of formulas 4 and 5.

In addition, a water-gas shift reaction of Formula 6 and the like occurs concurrent to the aforementioned reactions.

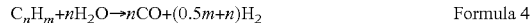
$C_nH_m+nH_2O \rightarrow nCO+(0.5m+n)H_2$  Formula 4

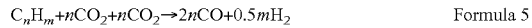
$C_nH_m+nCO_2+nCO_2 \rightarrow 2nCO+0.5mH_2$  Formula 5

$CO+H_2O \rightarrow CO_2+H_2$  Formula 6

Although the active metal in the present invention consists of at least one of precious metals in the form of Ru, Rh, Pd, Os, Ir and Pt or non-precious metals in the form of Ni, Co or Cu, or a mixture thereof, Rh, Pd, Ir, Pt, Ni, Co or Cu, which do not form volatile oxides in the presence of oxygen, are preferable, while Ni and Co are more preferable as a result of being inexpensive and having high hydrocarbon reforming capacity.

An oxide containing a rare earth element capable of changing oxygen number is used as a support in the present invention. In other words, the oxide is an oxide of at least one of rare earth elements (La, Ce, Pr, Nd, Sm, Eu, Gd, Tb, Dy, Ho, Er, Tm, Yb and Lu) or a mixture thereof, the oxide preferably containing La, Ce, Pr, Nd, Sm, Eu, Tb, Dy, Tm or Yb, which changes oxygen number and facilitates introduction of oxygen vacancies, and more preferably containing Ce, Pr or Tb, which facilitates introduction of oxygen vacancies due to a change in oxygen number between valences of +3 and +4. In addition, if the crystal structure of the oxide is able to adopt a fluorite structure, pyrochlore structure, A-type rare earth structure, B-type rare earth structure of C-type rare earth structure characteristic of oxides of rare earth elements, oxygen vacancies are formed easily, thereby making it possible to contain elements other than rare earth elements. In the case of Pr, however, since this element easily adopts an A-type rare earth structure if excessively reduced at a high temperature, compounds thereof are not suitable as indicated in the comparative examples. For example, the oxide is preferably that of a rare earth element capable of changing oxygen number between valences of +3 and +4, more preferably a complex oxide containing Ce and Zr or a complex oxide of Ce, Zr and Y, and the complex oxides have a fluorite structure characteristic of oxides of rare earth elements. In addition, if the oxide is able to adopt a perovskite structure, elements other than rare earth elements can also be contained since such oxides easily form oxygen vacancies. Examples of compounds having a perovskite structure include $BaCeO_3$, $SrCeO_3$, $CeMnO_3$, $CeNiO_3$, $BaPrO_3$, $SrPrO_3$, $PrMnO_3$ and $PrNiO_3$.

Activation treatment with a reducing gas in the present invention refers to treatment for obtaining a catalyst by reducing an oxide in a catalyst precursor and introducing oxygen lattice defects. Pure gases of $H_2$, the following hydrocarbons or CO, those that have been diluted with an inert gas, or inert gases such as Ar or $N_2$ can be used for the reducing gas. However, the use of pure $H_2$, pure hydrocarbon or that diluted with an inert gas has the potential to cause reductive activation of the active metal, thereby making this preferable since it increases the ease of driving the reaction. In addition, if pure $H_2$ or that diluted with an inert gas is used, there are no problems attributable to carbon precipitation, thereby making this more preferable. In addition, hydrocarbons and oxygen, etc. react in hydrocarbon direct heat supply reforming reactions resulting in the formation of CO, $H_2$ and other reducing gases at high temperatures, and these can also be used to reduce the oxide.

In the present invention, hydrocarbons mainly refer to propane gas, liquefied petroleum gas, gasoline, gas oil, petroleum, kerosene, naphtha and components thereof that consist mainly of hydrocarbons having 3 carbons or more, and are easily liquefied by compression near at room temperature, excluding methane and natural gas consisting mainly of methane. However, methane or natural gas consisting mainly of methane can also be used as a hydrocarbon. In addition, ethanol and other alcohols as well as dimethyl ether, expected to serve as a next-generation alternative fuel to gas oil, can also be used. In the case these contain sulfur components, a desulfurization step is preferably included when being supplied to the catalyst to inhibit deterioration of the reforming catalyst by sulfur poisoning.

The reforming reaction involves a reaction between hydrocarbon and steam, air, oxygen, carbon dioxide or a combination thereof. However, in the present invention, a reaction between hydrocarbon and air or oxygen referred to as a direct heat supply reforming reaction is carried out in order to use aerobic oxidation of a catalyst introduced with oxygen vacancies as the driving force of the combustion reaction and subsequent reforming reaction. Steam or $CO_2$ may also be present in the reaction system. Moreover, if $O_2$ in air is used for the oxygen source, a process for separating $N_2$ and $O_2$ required when obtaining pure $O_2$ can be omitted, thereby making this more preferable in terms of being able to reduce costs.

Production of the low-temperature hydrogen production catalyst and the hydrogen production method of the present invention can be carried out according to the procedures described below, for example. However, the present invention is not limited thereto.

(1) There are no particular limitations on the rare earth element-containing oxide used for the support, and rare earth oxide powder may be used, or the oxide may be obtained by precipitating a salt containing a rare earth element (such as $Ce(NO_3)_3.6H_2O$) in the form of $CeO_2$ or $Ce(OH)_4$ with a basic substance in an aqueous solution. In the case of containing two or more elements, the oxide may be precipitated in the form of a hydroxide in an aqueous solution containing salts of both. At this time, it is important to prepare a support composed of a single complex oxide phase. Consequently, the support may be obtained by precipitating a salt containing a rare earth element (such as $Ce(NO_3)_3.6H_2O$, $Pr(NO_3)_3.6H_2O$ or $Tb(NO_3)_3.6H_2O$), a salt containing $Zr(ZrO(NO_3)_2.2H_2O)$ and a salt containing Y ($Y(NO_3)_3.6H_2O$) in the form of a complex oxide or hydroxide in a basic aqueous solution containing ammonia or the like. A salt may also be precipitated by dropping a basic substance such as ammonia into an aqueous solution of a salt containing a rare earth element and Zr. The support may be prepared using a sol gel method or citric acid method.

(2) Next, although production may proceed to (3) while omitting this step, the rare earth element-containing oxide is preferably calcined at this time. The calcining atmosphere preferably consists of an air atmosphere in the presence or absence of a flowing gas such as air, $O_2$ or He (which may also be diluted with an inert gas, such as Ar). In addition, the calcining temperature is 400 to 1400° C. and preferably 600 to 1200° C. As a result of carrying out this procedure, the degree of sintering of the rare earth oxide increases, and although sintering of the rare earth oxide itself or sintering of the active metal is presumed to be inhibited during reaction pretreatment and during the reaction, if the calcining temperature is excessively high, sintering proceeds excessively causing the rare earth oxide to have an extremely small specific surface area, thereby making this undesirable. This procedure is also carried out for the purpose of removing any organic substances and the like remaining in the catalyst in step (1).

(3) Any metal raw material may be used to load an active metal in the form of at least one precious metal or non-precious metal, or a mixture thereof, into the rare earth oxide obtained in (1) or the calcined rare earth oxide obtained in (2). The loaded amount of each active metal (weight ratio of each active metal to catalyst precursor) is 0.01 to 7% by weight, preferably 0.015 to 5% by weight and more preferably 0.02 to 3% by weight in the case of precious metals since they are extremely expensive, or 0.5 to 50% by weight, preferably 1 to 40% by weight and more preferably 10 to 30% by weight in the case of non-precious metals since they are inexpensive. Furthermore, if the loaded amount is excessively large, large metal particles form resulting in the problem of precipitation of carbon on the catalyst during the reaction.

Although any substance may be used for these metal raw materials, examples of substances that may be used include $Ru(NO)(NO_3)_x(OH)_y$, $Rh(NO_3)_3.2H_2O$, $Pd(NO_3)_2$, $C_{15}H_{21}IrO_6$, $Pt(C_5H_7O_2)_2$, $Ni(NO_3)_2.6H_2O$ and $Co(NO_3)_2.6H_2O$. Examples of methods for loading these active metals include impregnation, and more specifically, by use of evaporation drying method or incipient wetness method, the active metal raw material dissolved in a solvent is loaded into the rare earth metal-containing oxide. Although there are no particular limitations on the loading order when loading a mixture of active metals, in the case of a mixture of Ni and Co, for example, if these are loaded simultaneously, a catalyst can be prepared in which Ni and Co are mixed well at the atomic level, thereby making this preferable.

Moreover, when preparing the rare earth metal-containing oxide using a precipitation method in (1), the active metal raw material may be added and precipitated with the support. In this case, since the active metal is also dispersed within the support, it offers the advantage of ultimately being able to form active metal fine particles, although a portion of the active metal ends up remaining within the support.

(4) Anions, ligands and basic components in the form of $NH_3$ and the like contained in the sample obtained in (3) are removed by calcining. More specifically, the sample is heated to a temperature that allows the removal of anions and ligands (which can be confirmed by gravimetric analysis of other method) in an air atmosphere in the presence or absence of flowing gas such as air, $O_2$ or He (which may have been diluted with an inert gas such as Ar), followed by holding at that temperature until they are completely finished being removed. For example, this temperature was 450° C. or higher in the case of Ni nitrate described in the following examples.

These anions and ligands may also be removed in the following activation process without carrying out this treatment here. The catalyst obtained in this manner is then preferably shaped as necessary. The catalyst obtained after drying may be crushed or formed into tablets using a tablet press.

In addition, a solid obtained at each of the steps of (1) to (4) may be dispersed in distilled water followed by charging therein a porous molded product for loading the solid into the porous molded product.

(5) Next, in this step for activating the catalyst precursor obtained in the manner described above, oxygen vacancies are introduced into the rare earth metal-containing oxide. To this end, activation treatment is carried out on the catalyst precursor using a reducing gas. A reducing gas in the form of a pure gas of $H_2$, the hydrocarbons indicated below or CO, that resulting from diluting these with an inert gas, or an inert gas per se, such as Ar or $N_2$, can be used for the atmosphere at that time. However, the use of pure $H_2$, pure hydrocarbon or that diluted with an inert gas has the potential to cause reductive activation of the active metal, thereby making this preferable since it increases the ease of driving the reaction. In addition, if pure $H_2$ or that diluted with an inert gas is used, there are no problems attributable to carbon precipitation, thereby making this more preferable. The reduction rate of the rare earth oxide increases the higher the treatment temperature, together with the number of oxygen vacancies increasing, and the degree of reduction of metal also improves in atmospheres in which a metal oxide of the active metal can be reduced to metal. However, if the treatment temperature is excessively high, there are the problems of decreases in the number of oxygen vacancies on the surface and the amount of metal present on the catalyst surface due to sintering of the catalyst. On the basis of the above, the reductive activation temperature has a proper temperature range according to the type of rare earth oxide as previously described.

In other words, if the reducing temperature is excessively high for the type of rare earth oxide, the rare earth oxide may undergo a phase transition resulting in the formation of a stable oxide phase that prevents it from being oxidized by oxygen at low temperatures.

For example, the proper reductive activation temperature when using $CeO_2$ for the rare earth oxide is 500 to 1000° C. The proper reductive activation temperature of $Pr_6O_{11}$ is 400 to 700° C. The proper reductive activation temperature of a complex oxide of Ce and Zr is 100 to 1000° C. The proper reductive activation temperature of a complex oxide of Ce, Zr and Y is 100 to 1000° C. These temperatures are based on results obtained from an atmospheric pressure fixed bed flow reaction apparatus as described in the examples. Since the amount of catalyst and total amount of heat generated are large in the case of a large-scale apparatus for use at the practical level, the suitable reductive activation temperature is presumed to be lower.

(6) In the direct heat supply hydrocarbon reforming, the aforementioned catalyst may be used alone or a catalyst within the scope of the present invention may be used in combination with another catalyst.

In addition, these catalysts may be used by mixing with a diluent such as alumina. The reforming reaction involves a reaction between hydrocarbon and steam, air, oxygen, carbon dioxide or combination thereof. However, in the present invention, a reaction between hydrocarbon and air or oxygen referred to as a direct heat supply reforming reaction is carried out in order to use heat generated from the reaction between the rare earth-containing oxide introduced with oxygen vacancies and oxygen as the driving force of the combustion reaction and subsequent reforming reaction. In addition, steam or $CO_2$ may also be present in the reaction system. Moreover, if $O_2$ in air is used for the oxygen source, a process for separating $N_2$ and $O_2$ required when obtaining pure $O_2$ can be omitted, thereby making this more preferable in terms of being able to reduce costs.

Although the reaction starting temperature is only required to be −40° C. or higher, which is the ambient temperature in cold climate regions, since the amount of heat to serve as the driving force can be reduced the higher the catalyst layer temperature at the start of the reaction, the reaction starting temperature is preferably 0° C. or higher, and more preferably 20° C. or higher. A temperature of 0° C. or higher allows water vapor to be present. Although the catalyst layer temperature at the start of the reaction may be high, it has been reported that if the temperature is 20° C. or higher, direct heat supply reforming reactions can be driven without using heat generation.

In addition, in order to solve the problem of the formation of methane in a reaction of $H_2$ with CO or $CO_2$ and the resulting consumption of hydrogen, formed $H_2$ may be rapidly removed from the reaction system by using an $H_2$ separation membrane. Although the reaction pressure (total pressure of supplied gases) is 0.01 to 3 MPa, since precipitation of carbon occurs easily at high pressures, the reaction pressure is preferably 0.01 to 1 MPa and more preferably 0.02 to 0.5 MPa, and an inert gas may be used as a diluting gas. Although the catalyst bed can be selected from a fixed bed, moving bed or fluidized bed, a fixed bed is preferable.

Example 1

Catalyst Precursor Preparation Example 1 (20 wt % Ni/$CeO_2$)

$CeO_2$ (Japan Reference Catalyst JRC-CEO-3) was used for the support. Using a furnace the $CeO_2$ was calcined in air for 5 hours at 800° C. to obtain calcined $CeO_2$.

13.3 g of nickel nitrate $Ni(NO_3)_2.6H_2O$ (Wako Pure Chemical Industries) were dissolved in distilled water in a 0.3 liter beaker and brought to a final volume of 0.15 liters. This was designated as Ni precursor aqueous solution (A).

Next, 10 g of the calcined $CeO_2$ were weighed out and added to the beaker containing the Ni precursor aqueous solution (A). After stirring this aqueous solution for 12 hours at room temperature, the beaker was heated and stirred to remove the water. Subsequently, a catalyst precursor was obtained by drying in an oven at 60° C. for 24 hours.

The catalyst precursor was crushed in a porcelain mortar and placed in a Pyrex® glass container, and the glass container was placed in a horizontal tube furnace, heated to 450° C. at a heating rate of 2° C./min in the presence of flowing air, held at that temperature for 5 hours and then air-cooled to room temperature. Subsequently, after forming into discs at 528 kg/cm$^2$ using a tablet press, the discs were crushed into pellets measuring 0.18 to 0.25 mm using a metal mesh.

Catalyst Precursor Preparation Example 2 (20 wt % Co/CeO$_2$)

A catalyst was prepared using the same procedure as that of Catalyst Precursor Preparation Example 1 with the exception of using 13.6 g of cobalt nitrate Co(NO$_3$)$_2$.6H$_2$O (Wako Pure Chemical Industries) instead of nickel nitrate Ni(NO$_3$)$_2$.6H$_2$O (Wako Pure Chemical Industries).

Catalyst Precursor Preparation Example 3 (1 wt % Rh/CeO$_2$)

A catalyst was prepared using the same procedure as that of Catalyst Precursor Preparation Example 1 with the exception of using 0.26 g of RhCl$_3$.3H$_2$O (Soekawa Chemical) instead of nickel nitrate Ni(NO$_3$)$_2$.6H$_2$O (Wako Pure Chemical Industries).

Catalyst Precursor Preparation Example 4 (20 wt % Ni/Pr$_6$O$_{11}$)

A catalyst was prepared using the same procedure as that of Catalyst Precursor Preparation Example 1 with the exception of using 5 g of Pr$_6$O$_{11}$ instead of CeO$_2$ (Japan Reference Catalyst JRC-CEO-3) and changing the amount of nickel nitrate Ni(NO$_3$)$_2$.6H$_2$O (Wako Pure Chemical Industries) used to 6.6 g. The Pr$_6$O$_{11}$ was prepared in the following manner. Pr(NO$_3$)$_3$.6H$_2$O (Kanto Kagaku) was dissolved in distilled water in a 0.3 liter beaker and brought to a final volume of 0.3 liters. This was designated as Pr$_6$O$_{11}$ precursor aqueous solution (B). Next, 0.1 liter of 25% aqueous NH$_3$ solution (Wako Pure Kagaku Industries) were placed in a 0.5 liter beaker and stirred. This was designated as aqueous ammonia solution (C). Next, the Pr$_6$O$_{11}$ precursor aqueous solution (B) was dropped into the aqueous ammonia solution (C) at the ate of 2 mL/min using a microtube pump. This suspension was stirred overnight at room temperature. Subsequently, after suction filtration with an aspirator and washing with distilled water was repeated five times, the precipitate on the filter paper was transferred to a porcelain evaporation dish and dried for at least 8 hours at 60° C. Subsequently, the dried product was heated to 550° C. at the rate of 2° C./min in an air atmosphere and calcined for 3 hours. Moreover, the dried product was further heated to 800° C. at the rate of 2° C./min and calcined for 5 hours.

Catalyst Precursor Preparation Example 5 (1 wt % Pt/CeO$_2$)

A catalyst was prepared using the same procedure as that of Catalyst Precursor Preparation Example 1 with the exception of using 0.28 g of H$_2$PtCl$_6$.6H$_2$O (Kishida Chemical) instead of nickel nitrate Ni(NO$_3$)$_2$.6H$_2$O (Wako Pure Chemical Industries).

Catalyst Precursor Preparation Example 6 (1 wt % Rh/CeO$_2$ 2)

A support in the form of CeO$_2$ was prepared by the precipitation method. 53 g of cerium (III) nitrate hexahydrate (Wako Pure Chemical Industries) were dissolved in 0.3 liters of distilled water in a 0.5 liter beaker. This was designated as CeO$_2$ precursor aqueous solution (A). 0.2 liters of 25% aqueous NH$_3$ solution were placed in a 1 liter beaker and stirred with a stirrer. The CeO$_2$ precursor aqueous solution (A) was then dropped into the 25% aqueous NH$_3$ solution using a microtube pump. At this time, the dropping rate was about 2 ml/min, and the resulting solution was stirred overnight as is following completion of dropping. On the following day, after repeating suction filtration and washing with 1 liter of distilled water three times and finally carrying out suction filtration, the precipitate was transferred to a porcelain evaporation dish and dried for at least 12 hours at 70° C. Subsequently, the dried product was pre-calcined by holding for 3 hours in an exhaust calcining furnace at 300° C. Moreover, after crushing in a mortar, the crushed product was calcined using a calcining furnace in air for 3 hours at 550° C. and then for 5 hours at 800° C. to obtain a calcined support.

Using this support, a catalyst was prepared using the same procedure as that of Catalyst Precursor Preparation Example 1 with the exception of using 0.30 g of Rh(NO$_3$)$_3$.nH$_2$O (Mitsuwa Chemicals) instead of nickel nitrate Ni(NO$_3$)$_2$.6H$_2$O (Wako Pure Chemical Industries).

Catalyst Precursor Preparation Example 7 (1 wt % Rh/Ce$_{0.75}$Zr$_{0.25}$O$_2$)

A support in the form of Ce$_{0.75}$Zr$_{0.25}$O$_2$ (molar ratio of Ce:Zr=0.75:0.25) was prepared by the precipitation method. The support was prepared using the same procedure as that of Catalyst Precursor Preparation Example 6 with the exception of using 43.2 g of cerium (III) nitrate hexahydrate (Wako Pure Chemical Industries) and 8.9 g of zirconyl nitrate dihydrate (Wako Pure Chemical Industries) instead of 53 g of cerium (III) nitrate hexahydrate (Wako Pure Chemical Industries).

Using this support, a catalyst was prepared using the same procedure as that of Catalyst Precursor Preparation Example 1 with the exception of using 0.30 g of Rh(NO$_3$)$_3$.nH$_2$O (Mitsuwa Chemicals) instead of nickel nitrate Ni(NO$_3$)$_2$.6H$_2$O (Wako Pure Chemical Industries).

Catalyst Precursor Preparation Example 8 (1 wt % Rh/Ce$_{0.50}$Zr$_{0.50}$O$_2$)

A support in the form of Ce$_{0.50}$Zr$_{0.50}$O$_2$ (molar ratio of Ce:Zr=0.50:0.50) was prepared by the precipitation method. The support was prepared using the same procedure as that of Catalyst Precursor Preparation Example 6 with the exception of using 53.1 g of cerium (III) nitrate hexahydrate (Wako Pure Chemical Industries) and 33 g of zirconyl nitrate dihydrate (Wako Pure Chemical Industries) instead of 53 g of cerium (III) nitrate hexahydrate (Wako Pure Chemical Industries).

Using this support, a catalyst was prepared using the same procedure as that of Catalyst Precursor Preparation Example 1 with the exception of using 0.30 g of Rh(NO$_3$)$_3$.nH$_2$O (Mitsuwa Chemicals) instead of nickel nitrate Ni(NO$_3$)$_2$.6H$_2$O (Wako Pure Chemical Industries).

Catalyst Precursor Preparation Example 9 (1 wt % Rh/Ce$_{0.25}$Zr$_{0.75}$O$_2$)

A support in the form of Ce$_{0.25}$Zr$_{0.75}$O$_2$ (molar ratio of Ce:Zr=0.25:0.75) was prepared by the precipitation method.

The support was prepared using the same procedure as that of Catalyst Precursor Preparation Example 6 with the exception of using 16.6 g of cerium (III) nitrate hexahydrate (Wako Pure Chemical Industries) and 31 g of zirconyl nitrate dihydrate (Wako Pure Chemical Industries) instead of 53 g of cerium (III) nitrate hexahydrate (Wako Pure Chemical Industries).

Using this support, a catalyst was prepared using the same procedure as that of Catalyst Precursor Preparation Example 1 with the exception of using 0.30 g of $Rh(NO_3)_3 \cdot nH_2O$ (Mitsuwa Chemicals) instead of nickel nitrate $Ni(NO_3)_2 \cdot 6H_2O$ (Wako Pure Chemical Industries).

Catalyst Precursor Preparation Example 10 (1 wt % $Pt/Ce_{0.50}Zr_{0.50}O_2$)

A support in the form of $Ce_{0.50}Zr_{0.50}O_2$ (molar ratio of Ce:Zr=0.50:0.50) was prepared using the same procedure as that of Catalyst Precursor Preparation Example 8.

A catalyst was prepared using the same procedure as that of Catalyst Precursor Preparation Example 1 with the exception of using 0.28 g of $H_2PtCl_6 \cdot 6H_2O$ (Kishida Chemical) instead of nickel nitrate $Ni(NO_3)_2 \cdot 6H_2O$ (Wako Pure Chemical Industries).

Catalyst Precursor Preparation Example 11 (20 wt % $Ni/Ce_{0.50}Zr_{0.50}O_2$)

A support in the form of $Ce_{0.50}Zr_{0.5}O_2$ (molar ratio of Ce:Zr=0.50:0.50) was prepared using the same procedure as that of Catalyst Precursor Preparation Example 8.

Using this support, a catalyst was prepared using the same procedure as that of Catalyst Precursor Preparation Example 1.

Catalyst Precursor Preparation Example 12 (20 wt % $Co/Ce_{0.50}Zr_{0.50}O_2$)

A support in the form of $Ce_{0.50}Zr_{0.50}O_2$ (molar ratio of Ce:Zr=0.50:0.50) was prepared using the same procedure as that of Catalyst Precursor Preparation Example 8.

Using this support, a catalyst was prepared using the same procedure as that of Catalyst Precursor Preparation Example 1 with the exception of using 13.6 g of cobalt nitrate $Co(NO_3)_2 \cdot 6H_2O$ (Wako Pure Chemical Industries) instead of nickel nitrate $Ni(NO_3)_2 \cdot 6H_2O$ (Wako Pure Chemical Industries).

Catalyst Precursor Preparation Example 13 (1 wt % $Rh/Ce_{0.50}Zr_{0.45}Y_{0.05}O_2$)

A support in the form of $Ce_{0.50}Zr_{0.45}Y_{0.05}O_2$ (molar ratio of Ce:Zr:Y=0.50:0.45:0.05) was prepared by the precipitation method. The support was prepared using the same procedure as that of Catalyst Precursor Preparation Example 6 with the exception of using 44.1 g of cerium (III) nitrate hexahydrate (Wako Pure Chemical Industries), 24.8 g of zirconyl nitrate dihydrate (Wako Pure Chemical Industries) and 3.8 g of yttrium nitrate hexahydrate (Kishida Chemical) instead of 53 g of cerium (III) nitrate hexahydrate (Wako Pure Chemical Industries).

Using this support, a catalyst was prepared using the same procedure as Catalyst Precursor Preparation Example 1 with the exception of using 0.30 g of $Rh(NO_3)_3 \cdot nH_2O$ (Mitsuwa Chemicals) instead of nickel nitrate $Ni(NO_3)_2 \cdot 6H_2O$ (Wako Pure Chemical Industries).

Catalyst Precursor Preparation Comparative Example 1 (20 wt % $Ni/Al_2O_3$)

A catalyst was prepared using the same procedure as that of Catalyst Precursor Preparation Example 1 with the exception of using 10 g of $Al_2O_3$ (Japan Reference Catalyst JRC-ALO-3) instead of $CeO_2$ (Japan Reference Catalyst JRC-CEO-3).

Catalyst Precursor Preparation Comparative Example 2 (20 wt % $Ni/TiO_2$)

A catalyst was prepared using the same procedure as that of Catalyst Precursor Preparation Example 1 with the exception of using 10 g of $TiO_2$ (Japan Reference Catalyst JRC-TIO4) instead of $CeO_2$ (Japan Reference Catalyst JRC-CEO-3).

Catalyst Precursor Preparation Comparative Example 3 (20 wt % Ni/MgO)

A catalyst was prepared using the same procedure as that of Catalyst Precursor Preparation Example 1 with the exception of using 10 g of MgO (Japan Reference Catalyst JRC-MGO-500A) instead of $CeO_2$ (Japan Reference Catalyst JRC-CEO-3).

Catalyst Precursor Preparation Comparative Example 4 (1 wt % $Rh/ZrO_2$)

A support in the form of $ZrO_2$ was prepared by the precipitation method. The support was prepared using the same procedure as that of Catalyst Precursor Preparation Example 6 with the exception of using 44 g of zirconyl nitrate dihydrate (Wako Pure Chemical Industries) instead of 53 g of cerium (III) nitrate hexahydrate (Wako Pure Chemical Industries).

Using this support, a catalyst was prepared using the same procedure as that of Catalyst Precursor Preparation Example 1 with the exception of using 0.30 g of $Rh(NO_3)_3 \cdot nH_2O$ (Mitsuwa Chemicals) instead of nickel nitrate $Ni(NO_3)_2 \cdot 6H_2O$ (Wako Pure Chemical Industries).

Reaction Example 1

Figure 1:
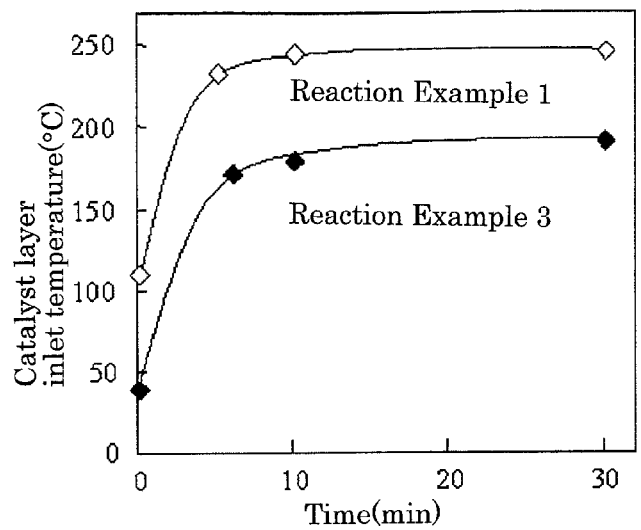
FIG. 1 is a graph illustrating time-based changes in catalyst layer inlet temperature in Reaction Example 1 and Reaction Example 3.

The following reaction was carried out using an atmospheric pressure fixed bed flow reaction apparatus. 0.1 g of the Catalyst Precursor Preparation Example 1 was filled into a metal reaction tube having an outer diameter of 9.9 mm, inner diameter of 7 mm and subjected to deactivation treatment on the inside thereof. The temperature was raised to 800° C. (10° C./min) in the presence of flowing pure $H_2$ (20 mL/min, 0.1 MPa), and the reaction tube was maintained at that temperature for 1 hour to carry out reductive activation treatment. The flow gas was then switched to Ar (50 ml/min) and the catalyst layer was cooled to 100° C. at which steam is able to be supplied stably. Activity was then measured under conditions consisting of a catalyst layer inlet temperature of 100° C. at the start of activity measurement, reaction pressure of 0.1 MPa, molar ratio of n-$C_4H_{10}/O_2/H_2O/N_2$/Ar of 1/2/4/1/7, total gas feed rate of 555 mL/min and spatial velocity (SV) of 333 L/hr·g. A thermocouple was installed at the inlet of the catalyst layer and temperature changes were monitored after starting the flow of reaction gas. The time-based changes in catalyst layer inlet temperature following completion of flow of the reaction gas are shown in FIG. 1, and the temperature of the catalyst layer after 30 minutes is shown in Table 1. In addition, the reaction product at that time (after 30 minutes) was analyzed with a gas chromatograph equipped with a TCD detector (6890N (Agilent Technologies), HP-PLOT Molesieve and HP-PLOT Q). During measurement of activity, heating with an electric furnace was not carried out, but rather the catalyst layer was heated by heat generated in the reaction. $N_2$ was used as an internal standard when calculating n-$C_4H_{10}$ conversion rate and $H_2$ formation rate. The calculation equations are as shown below (Equation 1).

$$C_4H_{10} \text{ conversion rate (\%)} = \frac{\substack{\text{Volumetric concentration of} \\ C_4H_{10} \text{ at reaction tube inlet} - \\ \text{Volumetric concentration of} \\ C_4H_{10} \text{ at reaction tube outlet} \times \alpha}}{\substack{\text{Volumetric concentration} \\ \text{of } C_4H_{10} \text{ at reaction tube inlet}}} \times 100 \quad \text{[Equation 1]}$$

$$\alpha = \frac{\substack{N_2 \text{ volumetric concentration} \\ \text{at reaction tube inlet}}}{\substack{N_2 \text{ volumetric concentration} \\ \text{at reaction tube outlet}}}$$

$$H_2 \text{ formation rate} = \frac{(C_4H_{10} \text{ flow rate at reaction tube inlet} \times 5 + H_2O \text{ flow rate at reaction tube inlet}) \times \text{hydrogen yield (\%)}}{100}$$

-continued $$\text{Hydrogen yield (\%)} = \frac{\substack{H_2 \text{ volumetric concentration} \\ \text{at reaction tube outlet} \times \alpha}}{\substack{C_4H_{10} \text{ volumetric concentration} \\ \text{at reaction tube inlet} \times 5 + \\ H_2O \text{ volumetric concentration} \\ \text{at reaction tube inlet}}} \times 100$$

The catalysts, reductive activation temperatures, catalyst layer inlet temperatures during the reaction (at the start of the reaction and 30 minutes later) and n-$C_4H_{10}$ conversion rates (after 30 minutes) are shown in Table 1.

Reaction Example 2

The reaction gas was switched to Ar after measuring activity in Reaction Example 1. Reduction activation by $H_2$ was carried out for 1 hour at 800° C. followed by cooling to 100° C. in the presence of flowing Ar. Activity was then measured under conditions consisting of a catalyst layer inlet temperature of 100° C. at the start of activity measurement, reaction pressure of 0.1 MPa, molar ratio of n-$C_4H_{10}$/$O_2$/$H_2O$/$N_2$/Ar of 1/2/4/1/7, total gas feed rate of 555 mL/min and spatial velocity (SV) of 333 L/hr·g. The results are shown in Table 1.

Reaction Example 3

The reaction gas was switched to Ar after measuring activity in Reaction Example 2. Reduction activation by $H_2$ was carried out for 1 hour at 800° C. followed by cooling to room temperature (36° C.) in the presence of flowing Ar. Activity was then measured under conditions consisting of a catalyst layer inlet temperature of 36° C. at the start of activity measurement, reaction pressure of 0.1 MPa, molar ratio of n-$C_4H_{10}$/$O_2$/$N_2$/Ar of 1/2/1/11, total gas feed rate of 555 mL/min and spatial velocity (GHSV) of 333 L/hr·g. Time-based changes in catalyst layer inlet temperature after starting the flow of reaction gas are shown in FIG. 1, while the results are shown in Table 1.

TABLE 1

| Reaction example | Catalyst precursor | Reductive activation temp. (° C.) | Catalyst layer inlet temp. (° C.) Start of reaction | Catalyst layer inlet temp. (° C.) After 30 min | n-$C_4H_{10}$ conversion rate after 30 min (%) | $H_2$ formation rate after 30 min (L/h·g) |
|---|---|---|---|---|---|---|
| 1 | Catalyst Precursor Preparation Example 1 | 800 | 100 | 248 | 81.7 | 101 |
| 2 | Catalyst Precursor Preparation Example 2 | 800 | 100 | 247 | 77.2 | 92.4 |
| 3 | Catalyst Precursor Preparation Example 3 | 800 | 36 | 193 | 79.4 | 80.0 |

Reaction Examples 4 TO 9

Reactions were carried out using Catalyst Precursor Preparation Examples 1 to 5 in accordance with Reaction Example 1. However, the reductive activation temperature was either 600° C. or 800° C. The catalyst layer inlet temperature at the start of measuring activity was 32 to 50° C. The molar ratio of n-$C_4H_{10}$/$O_2$/$N_2$/Ar of the reaction gas was 1/2/1/11, the total gas feed rate was 555 ml/min, and the spatial velocity (GHSV) was 333 L/hr·g. The reductive activation temperatures, catalyst layer inlet temperatures at the start of the reaction and the results are shown in Table 2.

TABLE 2

| Reaction example | Catalyst | Reductive activation temp. (° C.) | Catalyst layer inlet temp. (° C.) Start of reaction | Catalyst layer inlet temp. (° C.) After 30 min | n-$C_4H_{10}$ conversion rate after 30 min (%) |
|---|---|---|---|---|---|
| 4 | Catalyst Precursor Preparation Example 1 | 600 | 50 | 188 | 6.8 |

TABLE 2-continued

| Reaction example | Catalyst | Reductive activation temp. (° C.) | Catalyst layer inlet temp. (° C.) Start of reaction | Catalyst layer inlet temp. (° C.) After 30 min | n-$C_4H_{10}$ conversion rate after 30 min (%) |
|---|---|---|---|---|---|
| 5 | Catalyst Precursor Preparation Example 2 | 800 | 32 | 186 | 71.0 |
| 6 | Catalyst Precursor Preparation Example 3 | 800 | 34 | 202 | 68.8 |
| 7 | Catalyst Precursor Preparation Example 4 | 600 | 50 | 189 | 87.8 |
| 8 | Catalyst Precursor Preparation Example 5 | 800 | 50 | 250 | 73.5 |
| 9 | Catalyst Precursor Preparation Example 3 | 600 | 35 | 216 | 72.8 |

Reaction Comparative Examples 1 TO 5

Reactions were carried out using Catalyst Precursor Preparation Example 4 or Catalyst Precursor Preparation Comparative Examples 1 or 2 in accordance with Reaction Example 1. However, the reductive activation temperature was either 600° C. or 800° C. The catalyst layer inlet temperature at the start of measuring activity was 31 to 48° C. The molar ratio of n-$C_4H_{10}/O_2/N_2/Ar$ of the reaction gas was 1/2/1/11, the total gas feed rate was 555 ml/min, and the spatial velocity (GHSV) was 333 L/hr·g. The reductive activation temperatures, catalyst layer inlet temperatures at the start of the reaction and the results are shown in Table 3.

TABLE 3

| Reaction comparative example | Catalyst | Reductive activation temp. (° C.) | Catalyst layer inlet temp. (° C.) Start of reaction | Catalyst layer inlet temp. (° C.) After 30 min | n-$C_4H_{10}$ conversion rate after 30 min (%) |
|---|---|---|---|---|---|
| 1 | Catalyst Precursor Preparation Example 4 | 800 | 30 | 31 | 0 |
| 2 | Catalyst Precursor Preparation Comparative Example 1 | 600 | 47 | 44 | 0 |
| 3 | Catalyst Precursor Preparation Comparative Example 1 | 800 | 47 | 43 | 0 |
| 4 | Catalyst Precursor Preparation Comparative Example 2 | 600 | 50 | 48 | 0 |
| 5 | Catalyst Precursor Preparation Comparative Example 2 | 800 | 48 | 45 | 0 |

Reaction Compartive Examples 6 TO 8

Reactions were carried out using Catalyst Precursor Preparation Comparative Examples 1 to 3 in accordance with Reaction Example 1. The reductive activation temperature was 800° C. Activity was then measured under conditions consisting of a catalyst layer inlet temperature of about 30° C. at the start of activity measurement, reaction pressure of 0.1 MPa, molar ratio of n-$C_4H_{10}/O_2/N_2/Ar$ of 1/2/4/11, total gas feed rate of 555 mL/min and spatial velocity (GHSV) of 333 L/hr·g. However, activity was not demonstrated. Consequently, reductive activation by $H_2$ at 800° C. was repeated followed by cooling the catalyst layer in Ar, setting the catalyst layer inlet temperature to 100° C. at the start of activity measurement, and measuring activity under the conditions of a catalyst layer inlet temperature of 100° C. at the start of activity measurement, reaction pressure of 0.1 MPa, molar ratio of n-$C_4H_{10}/O_2/H_2O/N_2/Ar$ of 1/2/4/1/7, total gas feed rate of 555 mL/min and spatial velocity (SV) of 333 L/hr·g. Since activity was still not demonstrated, after again carrying out reductive activation by hydrogen at 800° C., the catalyst layer inlet temperature at the start of measuring activity was raised in 50° C. increments and this operation was repeated until activity was demonstrated (the reaction was carried out in the presence of $H_2O$). The reductive activation temperatures, catalyst layer inlet temperatures at the start of the reaction and the results are shown in Table 4.

TABLE 4

| Reaction comparative example | Catalyst | Reductive activation temp. (° C.) | Catalyst layer inlet temp. (° C.) Start of reaction | Catalyst layer inlet temp. (° C.) After 30 min | n-$C_4H_{10}$ conversion rate after 30 min (%) |
|---|---|---|---|---|---|
| 6 | Catalyst Precursor Preparation Comparative Example 1 | 800 | 198 | 214 | 63.1 |
| 7 | Catalyst Precursor Preparation Comparative Example 2 | 800 | 355 | 370 | 67.5 |
| 8 | Catalyst Precursor Preparation Comparative Example 3 | 800 | 251 | 284 | 67.1 |

According to Tables 1 to 4, the catalyst precursors that contain $CeO_2$ shown in Catalyst Precursor Preparation Examples 1 to 5 clearly demonstrated activity around room temperature following the reductive activation treatment at 600 to 800° C. In addition, as shown in FIG. 1, despite the power supply of the electric furnace having been switched off, since the temperature of the catalyst layer rose to 250 or 190° C. and remained nearly constant, it was determined that heat generated from combustion of n-$C_4H_{10}$ was used in the endothermic reforming reaction enabling the reaction to proceed in the form of a thermally self-sufficient, so-called autothermal reforming reaction. Moreover, these catalysts allowed the apparatus to be repeatedly started and stopped (Reaction Examples 1 to 3). On the other hand, in the case of 20 wt % Ni/$Pr_6O_{11}$ indicated in Catalyst Precursor Production Example 4, although activity was demonstrated at 50° C. following the reductive activation at 600° C. (Reaction Example 7), activity was not demonstrated around room temperature following the reductive activation at 800° C. (Reaction Comparative Example 1). This indicates that the optimum reductive activation temperature varies depending on the type of support.

In contrast, in Catalyst Precursor Preparation Comparative Examples 1 and 2, activity was not demonstrated at 30 to 50° C. at a reductive activation temperature of 600 or 800° C. The catalyst layer temperatures when activity was demonstrated in Catalyst Precursor Preparation Examples 1 to 3, including the comparative examples described above, were 198° C. or higher.

On the basis of these results for activity measurement, by using $CeO_2$ or $Pr_6O_{11}$ as a support, using a catalyst precursor loaded with metal, and suitably controlling the reductive activation temperature, a hydrogen production reaction using reforming of hydrocarbon was clearly demonstrated to be able to be driven at normal temperatures or in the vicinity of normal temperatures.

Next, several experiments were conducted to clarify the mechanism by which the hydrogen production reaction was able to be driven by hydrogen reforming at normal temperatures.

Similar to Reaction Example 1, 0.1 g of Catalyst Precursor Preparation Example 1 was filled into an atmospheric pressure fixed bed flow reaction apparatus followed by carrying out reductive activation with pure $H_2$ at 800° C. The flow gas was switched to Ar (50 mL/min) and the catalyst layer was cooled to room temperature (31° C.). The catalyst was then allowed to react with $O_2$ under conditions consisting of a catalyst layer inlet temperature of 31° C. at the start of activity measurement, reaction pressure of 0.1 MPa, molar ratio of $O_2$/Ar of 1/4, total gas feed rate of 100 mL/min and spatial velocity (SV) of 60 L/hr·g. A thermocouple was installed at the inlet of the catalyst layer and temperature changes were monitored after starting the flow of reaction gas. The catalyst layer inlet temperatures at 0, 2, 4 and 6 minutes after the start of the reaction were 31, 63, 45 and 40° C., and heat was determined to be generated according to Equation 1.

The following reaction was carried out using an atmospheric pressure fixed bed pulsed-flow reaction apparatus. 0.1 g of $CeO_2$ or $Pr_6O_{11}$ not loaded with Catalyst Precursor Preparation Example 1, Catalyst Precursor Preparation Example 4 or Ni was filled into a metal reaction tube having an outer diameter of 9.9 mm, inner diameter of 7 mm and subjected to deactivation treatment on the inside thereof. The temperature was raised to 600 or 800° C. (10° C./min) in the presence of flowing pure $H_2$ (30 mL/min, 0.1 MPa), and the reaction tube was maintained at that temperature for 1 hour to carry out reductive activation treatment. The flow gas was then switched to Ar (30 ml/min) and the catalyst layer was cooled to 50° C. 2.88 mL of pure $O_2$ were then pulsed at that temperature, and the amount of $O_2$ that remained without being absorbed by the catalyst was quantified with a TCD detector. Hardly any absorption of $O_2$ was observed by the time of the third pulse for each of the catalysts. The catalysts, reductive activation temperatures and total amount of $O_2$ absorbed up to the second pulse are shown in Table 5.

TABLE 5

|  | Reductive activation temp. (° C.) | $O_2$ absorption (micromoles/g) |
| --- | --- | --- |
| Catalyst Precursor Preparation Example 1 | 600 | 1003 |
| Catalyst Precursor Preparation Example 1 | 800 | 1296 |

TABLE 5-continued

|  | Reductive activation temp. (° C.) | $O_2$ absorption (micromoles/g) |
| --- | --- | --- |
| Catalyst Precursor Preparation Example 4 | 600 | 1729 |
| $CeO_2$ | 600 | 523 |
| $CeO_2$ | 800 | 845 |
| $Pr_6O_{11}$ | 600 | 834 |

According to Table 5, oxygen was determined to be absorbed at 50° C. due to reductive activation of $CeO_2$ or $Pr_6O_{11}$. These results suggest that the oxides that have oxygen vacancies reacted with oxygen (Reaction Formulas 1 and 2). This trend was maintained even after loading with Ni, again suggesting a reaction between oxygen vacancies and oxygen according to Reaction Formulas 1 and 2.

According to the results for the reaction between the catalysts and $O_2$ described above and Table 5, heat was determined to be generated when Catalyst Precursor Preparation Examples 1 and 4 reacted with oxygen (Reaction Formulas 1 and 2). Consequently, the n-$C_4H_{10}$ combustion reaction (Reaction Formula 3) and its subsequent reforming reaction (Reaction Formulas 4 and 5) were presumed to have proceeded as a result of using this generation of heat as the driving force of the reactions and allowing reaction gas to flow over the catalyst layer.

Next, with respect to Catalyst Precursor Preparation Example 4 (20 wt % Ni/$Pr_6O_{11}$), in order to examine the reason why activity was not demonstrated in the vicinity of room temperature following the reductive activation at 800° C. despite activity having been demonstrated at about 50° C. following the reductive activation at 600° C., the catalyst was transferred to air at normal temperatures following the activation at each temperature and measured for XRD (FIG. 2). XRD patterns for Ni and $Pr_6O_{11}$ were observed in the sample (A) that underwent reductive activation at 600° C., this sample generated heat when removed from the reaction tube, and it was suggested that the oxide having oxygen vacancies reacts with oxygen in accordance with Reaction Formula 2 and is oxidized so as to be returned to $Pr_6O_{11}$. In contrast, $Pr_2O_3$ was observed in addition to Ni and $Pr_6O_{11}$ in the sample (B) that underwent reductive activation at 800° C., and the $Pr_2O_3$ that formed as a result of reduction was determined to not be oxidized to $Pr_6O_{11}$ even if contacted by oxygen at normal temperatures. In contrast to $Pr_6O_{11}$ having a C-type rare earth structure, $Pr_2O_3$ is known to adopt a stable A-type rare earth structure. When reductive activation was carried out at 600° C., a portion of the oxygen escaped from the $Pr_6O_{11}$ and $Pr_6O_{11-y}$ was formed that retained its C-type rare earth structure, and this sample was susceptible to oxidation by oxygen. In contrast, when reduction was carried out at a high temperature of 800° C., a portion of the crystal structure changed to an A-type rare earth structure and became stabilized, thereby demonstrating that the n-$C_4H_{10}$ combustion reaction (Reaction Formula 3) and its subsequent reforming reaction (Reaction Formula 4) were unable to be driven as a result of not being oxidized by oxygen at normal temperatures. In Catalyst Precursor Preparation Example 1, even after carrying out reductive activation at both temperatures of 600 and 800° C., metal Ni, NiO (600° C. only) and fluorite $CeO_2$ were observed (FIG. 3). In the case of this catalyst, regardless of which temperature reductive activation is carried out, it was suggested to return to its original structure ($CeO_2$) as a result of being oxidized by air when the sample was transferred to air.

Oxygen absorption following the reductive activation at 800° C. was further measured for other catalysts using $CeO_2$ as a support.

TABLE 6

| | Reductive activation temp. (° C.) | $O_2$ absorption (micromoles/g) |
|---|---|---|
| Catalyst Precursor Preparation Example 2 | 800 | 1576 |
| Catalyst Precursor Preparation Example 3 | 800 | 888 |
| Catalyst Precursor Preparation Example 5 | 800 | 969 |

According to Table 6, large amounts of oxygen were able to be absorbed at room temperature following the reductive activation for Catalyst Precursor Preparation Examples 2, 3 and 5 as well, and this absorption of oxygen was determined to serve as the driving force of the reaction.

Reaction Examples 10 TO 12

Reactions were carried out using Catalyst Precursor Preparation Examples 2, 3 and 5 in accordance with Reaction Example 1. However, the reductive activation temperature was set to 800° C. The catalyst layer inlet temperature at the start of activity measurement was set to 100° C. The molar ratio of $n\text{-}C_4H_{10}/O_2/H_2O/N_2/Ar$ of the reaction gas was 1/2/4/1/7, the total gas feed rate was 555 mL/min and the spatial velocity (GHSV) was 333 L/hr·g. The reductive activation temperatures, catalyst layer inlet temperatures at the start of the reaction and the results are shown in Table 7.

TABLE 7

| Reaction example | Catalyst precursor | Reductive activation temp. (° C.) | Catalyst layer inlet temp. (° C.) Start of reaction | Catalyst layer inlet temp. (° C.) After 30 min | $n\text{-}C_4H_{10}$ conversion rate after 30 min (%) |
|---|---|---|---|---|---|
| 10 | Catalyst Precursor Preparation Example 2 | 800 | 100 | 167 | 59.4 |
| 11 | Catalyst Precursor Preparation Example 3 | 800 | 100 | 170 | 56.7 |
| 12 | Catalyst Precursor Preparation Example 5 | 800 | 100 | 189 | 73.8 |

According to Table 7, by using $CeO_2$ for the support, activity was determined to be demonstrated at low temperatures in the presence of steam in the same manner as catalysts loaded with Ni, regardless of the type of metal (Co, Rh or Pt).

Reaction Example 13

Figure 4:
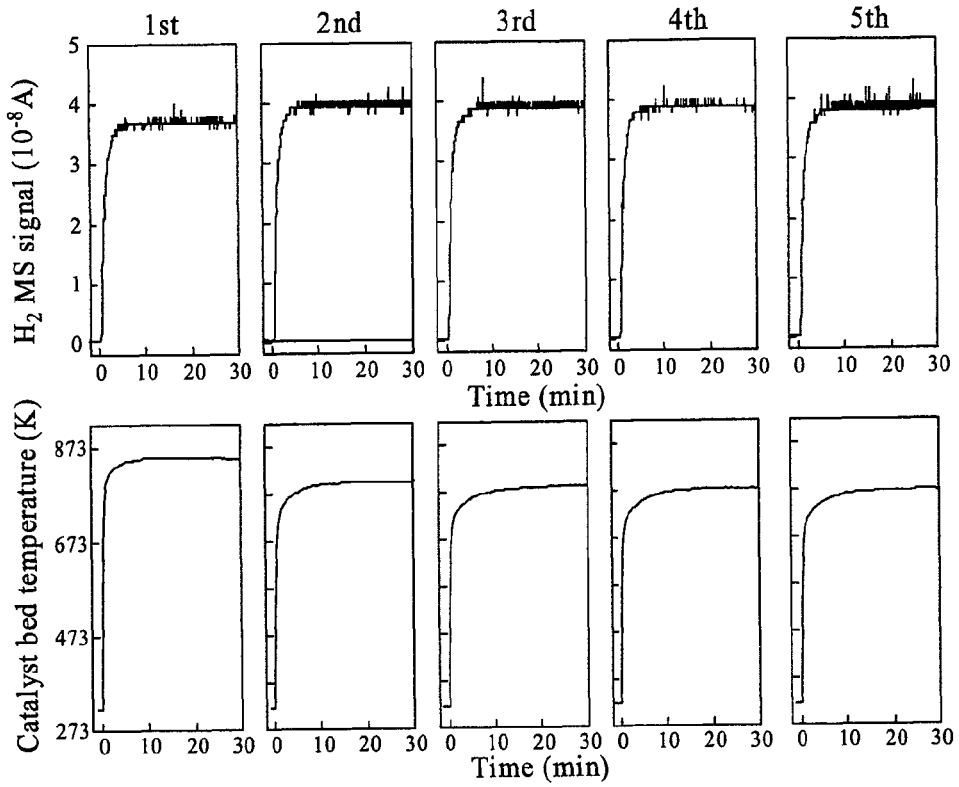
FIG. 4 shows activities and catalyst layer temperatures of Catalyst Precursor Preparation Example 3 following reduction treatment at 800° C. (Reaction Example 13).
Figure 5:
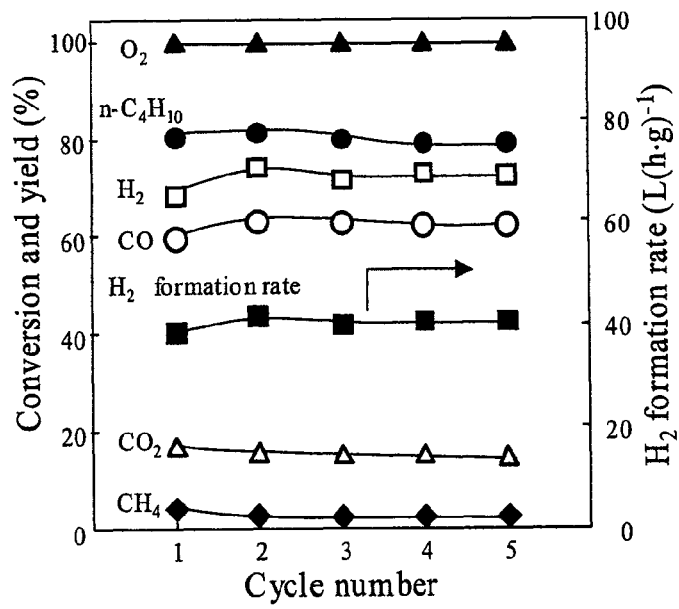
FIG. 5 shows conversion rates, yields and hydrogen formation rates of Catalyst Precursor Preparation Example 3 following reduction treatment at 800° C.

An additional study was conducted on Catalyst Precursor Preparation Example 3. First, Reaction Example 13 was carried out in accordance with Reaction Example 1. However, the reductive activation temperature was set to 800° C., and the spatial velocity (GHSV) was set to 167 L/hr·g. The catalyst layer inlet temperature at the start of activity measurement was set to 50° C. In addition, the molar ratio of $n\text{-}C_4H_{10}/O_2/N_2/Ar$ of the reaction gas was 1/2/1/11, and the total gas feed rate was 555 mL/min. In this example, analysis using a mass spectrometer (M-201QA-TDM (Canon Anelva)) was carried out in addition to analysis of the product by gas chromatography. After reacting for 35 minutes, the reaction gas was switched to Ar followed by reducing at 800° C., cooling in the presence of Ar and reacting at 50° C., and this procedure was repeated four times. Furthermore, a thermocouple was inserted into the catalyst layer to measure temperature changes within the catalyst layer. The hydrogen formation (m/e=2) along with temperature changes of the catalyst layer are shown in FIG. 4, while the conversion rate and yield after 30 minutes in each cycle are shown in FIG. 5. The calculation equations used for CO, $CO_2$ and $CH_4$ yields are as shown below.

$$O_2 \text{ conversion rate } (\%) = \frac{\substack{\text{Volumetric concentration of} \\ O_2 \text{ at reaction tube inlet} - \\ \text{volumetric concentration of} \\ O_2 \text{ at reaction tube outlet} \times \alpha}}{\substack{\text{Volumetric concentration} \\ \text{of } O_2 \text{ at reaction tube inlet}}} \times 100 \quad \text{[Equation 1]}$$

$$\text{CO yield } (\%) = \frac{\substack{\text{Volumetric concentration of CO} \\ \text{at reaction tube outlet} \times \alpha}}{\substack{\text{Volumetric concentration of} \\ C_4H_{10} \text{ at reaction tube inlet} \times 4}} \times 100$$

$$CO_2 \text{ yield } (\%) = \frac{\substack{\text{Volumetric concentration of } CO_2 \\ \text{at reaction tube outlet} \times \alpha}}{\substack{\text{Volumetric concentration of} \\ C_4H_{10} \text{ at reaction tube inlet} \times 4}} \times 100$$

$$CH_4 \text{ yield } (\%) = \frac{\substack{\text{Volumetric concentration of} \\ CH_4 \text{ at reaction tube outlet} \times \alpha}}{\substack{\text{Volumetric concentration of } C_4H_{10} \\ \text{at reaction tube inlet} \times 4}} \times 100$$

As shown in FIG. 4, when the reaction gas passed over the catalyst, a rapid temperature rise and hydrogen formation were observed. This means that the reaction was driven at 50° C. Although the temperature of the catalyst layer reached 500° C. in 0.7 minutes in the first cycle, it is surmised to have risen faster at certain locations. In addition, the rate of hydrogen formation reached a maximum several minutes after the start of the reaction and remained stable at that level. It is presumed that at that point, a balance was achieved among the exothermic reaction, endothermic reaction and the release of heat to the outside, thereby indicating stable activity. When the reaction gas was passed over the catalyst in all five cycles, hydrogen was formed rapidly and activity reached a constant state in about 3 minutes. Although the maximum temperature of the catalyst layer decreased with the number of cycles, the concentration of formed hydrogen, namely the hydrogen formation rate, remained nearly constant (FIG. 5). The $O_2$ conversion rate was 100% at all times and the $n\text{-}C_4H_{10}$ conversion rate was about 80%. The decrease in temperature of the catalyst layer was presumed to be due to slight sintering of the catalyst. The reaction products were $H_2$, $CO_2$, CO, $H_2O$ and $CH_4$. Furthermore, when the amount of carbon precipitation was measured after five cycles by temperature programmed oxidation (consisting of heating a sample in the presence of flowing $O_2$/Ar and removing carbon species on the catalyst, in the form of CO and $CO_2$, followed by quantification thereof by gas chromatography), the amount of carbon precipitation was determined to be 0.19% by weight, thus demonstrating hardly any precipitation of carbon.

Next, in order to confirm that heat generated in the reaction represented by $CeO_{2-x}+0.5xO_2 \rightarrow CeO_2$ drove the combustion reaction and subsequent reforming reaction, Catalyst Precursor Preparation Example 3 was reduced at 800° C. followed by passing a gas at a molar ratio of $O_2/Ar/N_2$ of 2/12/1 over the catalyst at 50° C. Temperature changes within the catalyst layer at that time are shown in FIG. 6.

Figure 6:
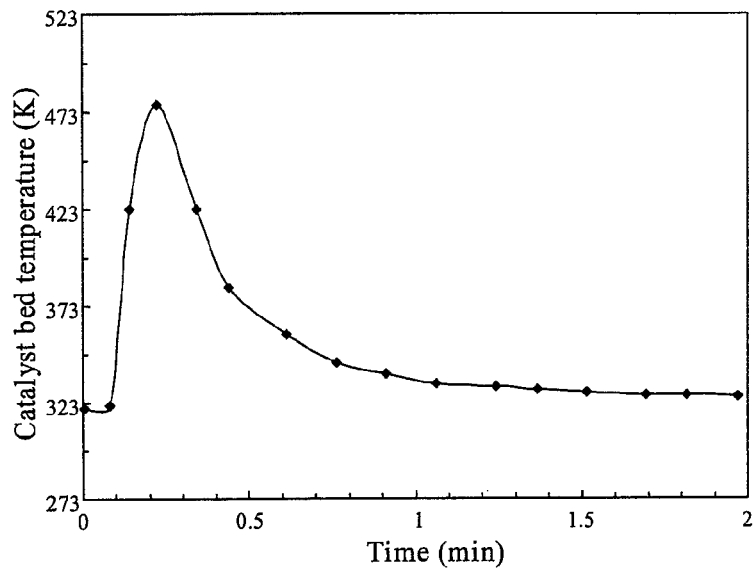
FIG. 6 shows temperature changes within the catalyst layer of Catalyst Precursor Preparation Example 3 following reduction treatment at 800° C. (during passage of $O_2/Ar/N_2$).

According to FIG. 6, the temperature rose to 204° C. in 0.2 minutes when the reaction gas was passed over the catalyst, thereby confirming adequate generation of heat in the catalyst layer, which is the driving force of the reaction. Furthermore, the composition of $CeO_2$, in Catalyst Precursor Preparation Example 3 following reduction at 800° C. was determined to be $CeO_{1.7}$ based on the $O_2$ absorption shown in Table 6.

Figure 7:
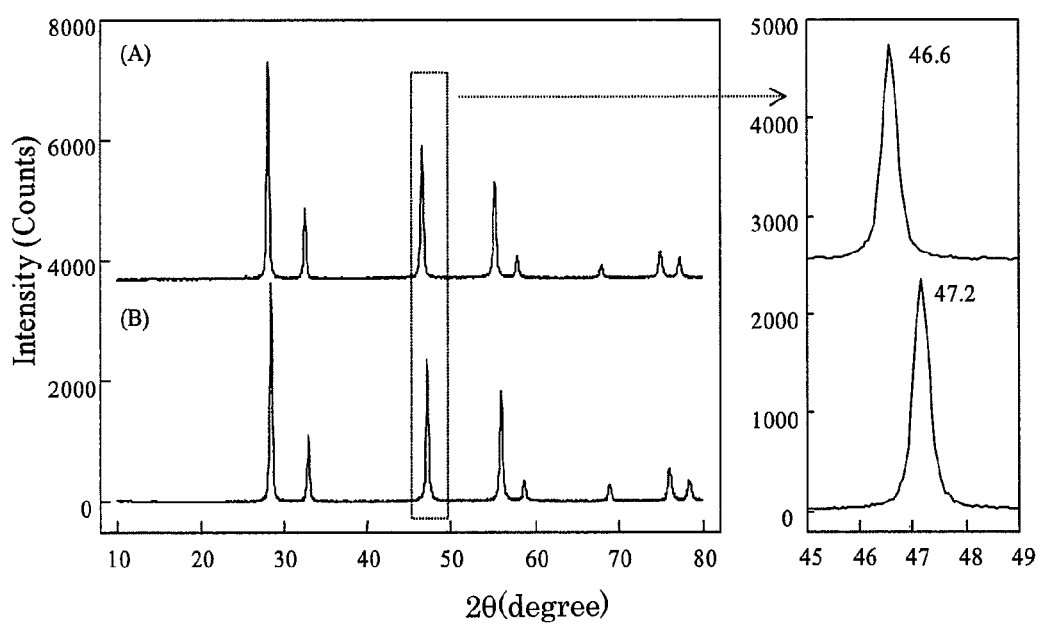
FIG. 7 shows in situ XRD patterns of Catalyst Precursor Preparation Example 3 at 800° C. during $H_2$/Ar treatment (A) and flowing air treatment (B).

Moreover, Catalyst Precursor Preparation Example 3 was measured by in situ XRD either after treating the catalyst by passing over $H_2$/He (5/95) at 800° C. or by treating with an air flow as is. The results are shown in FIG. 7.

The XRD pattern at room temperature was assigned to $CeO_2$ having a hexagonal fluorite structure, and a=b=c=0.540 nm. A hexagonal fluorite structure was only observed for the XRD patterns measured at 800° C. regardless of the type of treatment. When the lattice constant was determined from the peak of the (220) plane having a peak maximum at 2θ=46 to 48° C., it was found to be 0.552 nm following treatment with flowing $H_2$/He (5/95) and 0.545 nm following treatment with air. Since these parameters were measured at 800° C., the values were larger than those at room temperature. The reason for having obtained larger values following treatment with $H_2$/He (5/95) than treatment with air at 800° C. is presumed to be due too expansion of the lattice caused by the formation of oxygen lattice defects.

Reaction Example 14

Reaction Example 14 was carried out using Catalyst Precursor Preparation Example 6 in accordance with Reaction Example 1. Temperature changes within the catalyst layer were measured by using a quartz reaction tube and inserting a thermocouple into the catalyst layer. The reductive activation temperature was set to 600° C. The catalyst layer temperature at the start of activity measurement was set to 50° C. The reaction gas consisted of n-$C_4H_{10}/O_2/N_2$/Ar at a molar ratio of 1/2/1/7, the total gas feed rate was 407 mL/min, and the spatial velocity (GHSV) was 244 L/hr·g. The reductive activation temperature, catalyst layer inlet temperature at the start of the reaction and the results are shown in Table 8.

Reaction Examples 15 AND 16

Reaction Example 15 was carried out using Catalyst Precursor Preparation Example 7 in accordance with Reaction Example 1. Temperature changes within the catalyst layer were measured by using a quartz reaction tube and inserting a thermocouple into the catalyst layer. The reductive activation temperature was set to 200° C. The catalyst layer temperature at the start of activity measurement was set to 50° C. The reaction gas consisted of n-$C_4H_{10}/O_2/N_2$/Ar at a molar ratio of 1/2/1/7, the total gas feed rate was 407 mL/min, and the spatial velocity (GHSV) was 244 L/hr·g.

The reaction was stopped by switching the reaction gas to Ar after carrying out the reaction for 40 minutes. Reaction Example 16 was then carried out under the same conditions as those following the reductive activation by again adjusting the catalyst layer temperature to 50° C. The reductive activation temperatures, catalyst layer inlet temperatures at the start of the reaction and the results are shown in Table 8.

Reaction Examples 17 AND 18

Reaction Example 17 was carried out using Catalyst Precursor Preparation Example 8 in accordance with Reaction Example 1. Temperature changes within the catalyst layer were measured by using a quartz reaction tube and inserting a thermocouple into the catalyst layer. The reductive activation temperature was set to 100° C. The catalyst layer temperature at the start of activity measurement was set to 50° C. The reaction gas consisted of n-$C_4H_{10}/O_2/N_2$/Ar at a molar ratio of 1/2/1/7, the total gas feed rate was 407 mL/min, and the spatial velocity (GHSV) was 244 L/hr·g.

The reaction was stopped by switching the reaction gas to Ar after carrying out the reaction for 40 minutes. Reaction Example 18 was then carried out under the same conditions as those following the reductive activation by again adjusting the catalyst layer temperature to 50° C. The reductive activation temperatures, catalyst layer inlet temperatures at the start of the reaction and the results are shown in Table 8.

Reaction Examples 19 AND 20

Reaction Example 19 was carried out using Catalyst Precursor Preparation Example 9 in accordance with Reaction Example 1. Temperature changes within the catalyst layer were measured by using a quartz reaction tube and inserting a thermocouple into the catalyst layer. The reductive activation temperature was set to 100° C. The catalyst layer temperature at the start of activity measurement was set to 50° C. The reaction gas consisted of n-$C_4H_{10}/O_2/N_2$/Ar at a molar ratio of 1/2/1/7, the total gas feed rate was 407 mL/min, and the spatial velocity (GHSV) was 244 L/hr·g.

The reaction was stopped by switching the reaction gas to Ar after carrying out the reaction for 40 minutes. Reaction Example 20 was then carried out under the same conditions as those following the reductive activation by again adjusting the catalyst layer temperature to 50° C. The reductive activation temperatures, catalyst layer inlet temperatures at the start of the reaction and the results are shown in Table 8.

Reaction Example 21

Reaction Example 21 was carried out using Catalyst Precursor Preparation Example 10 in accordance with Reaction Example 1. Temperature changes within the catalyst layer were measured by using a quartz reaction tube and inserting a thermocouple into the catalyst layer. The reductive activation temperature was set to 200° C. The catalyst layer temperature at the start of activity measurement was set to 50° C. The reaction gas consisted of n-$C_4H_{10}/O_2/N_2$/Ar at a molar ratio of 1/2/1/7, the total gas feed rate was 407 mL/min, and the spatial velocity (GHSV) was 244 L/hr·g. The reductive activation temperature, catalyst layer inlet temperature at the start of the reaction and the results are shown in Table 8.

Reaction Example 22

Reaction Example 22 was carried out using Catalyst Precursor Preparation Example 11 in accordance with Reaction Example 1. Temperature changes within the catalyst layer were measured by using a quartz reaction tube and inserting a thermocouple into the catalyst layer. The reductive activation temperature was set to 600° C. The catalyst layer temperature at the start of activity measurement was set to 50° C. The reaction gas consisted of n-$C_4H_{10}$/$O_2$/$N_2$/Ar at a molar ratio of 1/2/1/7, the total gas feed rate was 407 mL/min, and the spatial velocity (GHSV) was 244 L/hr·g. The reductive activation temperature, catalyst layer inlet temperature at the start of the reaction and the results are shown in Table 8.

Reaction Examples 23 AND 24

Reaction Example 23 was carried out using Catalyst Precursor Preparation Example 12 in accordance with Reaction Example 1. Temperature changes within the catalyst layer were measured by using a quartz reaction tube and inserting a thermocouple into the catalyst layer. The reductive activation temperature was set to 400° C. The catalyst layer temperature at the start of activity measurement was set to 50° C. The reaction gas consisted of n-$C_4H_{10}$/$O_2$/$N_2$/Ar at a molar ratio of 1/2/1/7, the total gas feed rate was 407 mL/min, and the spatial velocity (GHSV) was 244 L/hr·g.

The reaction was stopped by switching the reaction gas to Ar after carrying out the reaction for 40 minutes. Reaction Example 24 was then carried out under the same conditions as those following the reductive activation by again adjusting the catalyst layer temperature to 50° C. The reductive activation temperatures, catalyst layer inlet temperatures at the start of the reaction and the results are shown in Table 8.

Reaction Examples 25 AND 26

Reaction Example 25 was carried out using Catalyst Precursor Preparation Example 13 in accordance with Reaction Example 1. Temperature changes within the catalyst layer were measured by using a quartz reaction tube and inserting a thermocouple into the catalyst layer. The reductive activation temperature was set to 100° C. The catalyst layer temperature at the start of activity measurement was set to 50° C. The reaction gas consisted of n-$C_4H_{10}$/$O_2$/$N_2$/Ar at a molar ratio of 1/2/1/7, the total gas feed rate was 407 mL/min, and the spatial velocity (GHSV) was 244 L/hr·g. The reductive activation temperature, catalyst layer inlet temperature at the start of the reaction and the results are shown in Table 8.

The reaction was stopped by switching the reaction gas to Ar after carrying out the reaction for 40 minutes. Reaction Example 26 was then carried out under the same conditions as those following the reductive activation by again adjusting the catalyst layer temperature to 50° C. The reductive activation temperature, catalyst layer inlet temperature at the start of the reaction and the results are shown in Table 8.

TABLE 8

| Reaction example | Catalyst precursor | Reductive activation temp. (° C.) | Catalyst layer inlet temp. (° C.) Start of reaction | Catalyst layer inlet temp. (° C.) After 10 min | n-$C_4H_{10}$ conversion rate after 40 min (%) |
|---|---|---|---|---|---|
| 14 | Catalyst Precursor Preparation Example 6 | 600 | 50 | 402 | 77.0 |
| 15 | Catalyst Precursor Preparation Example 7 | 200 | 50 | 506 | 70.6 |
| 16 | Catalyst Precursor Preparation Example 7 |  | 50 | 488 | 67.9 |
| 17 | Catalyst Precursor Preparation Example 8 | 100 | 50 | 610 | 64.3 |
| 18 | Catalyst Precursor Preparation Example 8 |  | 50 | 612 | 69.1 |
| 19 | Catalyst Precursor Preparation Example 9 | 100 | 50 | 659 | 89.4 |
| 20 | Catalyst Precursor Preparation Example 9 |  | 50 | 476 | 84.7 |
| 21 | Catalyst Precursor Preparation Example 10 | 200 | 50 | 659 | 63.8 |
| 22 | Catalyst Precursor Preparation Example 11 | 600 | 50 | 550 | 67.5 |
| 23 | Catalyst Precursor Preparation Example 12 | 400 | 50 | 560 | 46.5 |
| 24 | Catalyst Precursor Preparation Example 12 |  | 50 | 559 | 42.9 |
| 25 | Catalyst Precursor Preparation Example 13 | 100 | 50 | 637 | 75.2 |
| 26 | Catalyst Precursor Preparation Example 13 |  | 50 | 630 | 73.8 |

Reaction Comparative Example 9

Reaction Comparative Example 9 was carried out using Catalyst Precursor Preparation Comparative Example 4 in accordance with Reaction Example 1. Temperature changes within the catalyst layer were measured by using a quartz reaction tube and inserting a thermocouple into the catalyst layer. The reductive activation temperature was set to 800° C. The catalyst layer temperature at the start of activity measurement was set to 50° C. The reaction gas consisted of n-$C_4H_{10}$/$O_2$/$N_2$/Ar at a molar ratio of 1/2/1/7, the total gas feed rate was 407 mL/min, and the spatial velocity (GHSV) was 244 L/hr·g. The reductive activation temperature, catalyst layer inlet temperature at the start of the reaction and the results are shown in Table 9.

TABLE 9

| Reaction comparative example | Catalyst | Reductive activation temp. (° C.) | Catalyst layer inlet temp. (° C.) Start of reaction | Catalyst layer inlet temp. (° C.) After 10 min | n-$C_4H_{10}$ conversion rate after 40 min (%) |
|---|---|---|---|---|---|
| 9 | Catalyst Precursor Preparation Comparative Example 4 | 800 | 50 | 50 | 0 |

Figure 8:
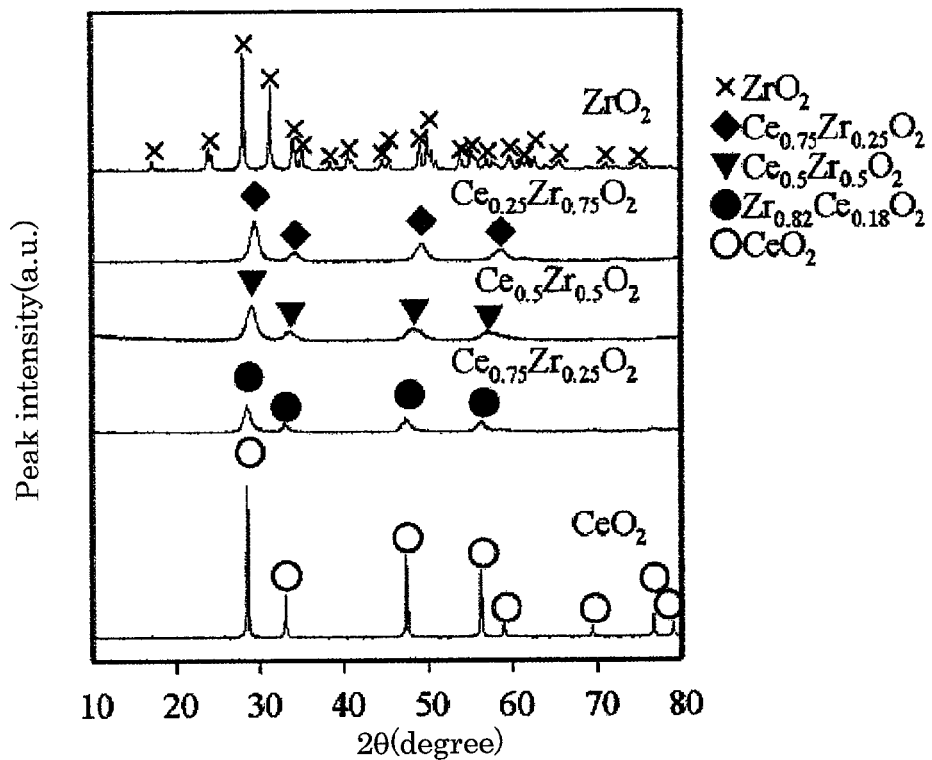
FIG. 8 shows XRD patterns of supports of Catalyst Precursor Preparation Examples 6 to 12 and Catalyst Preparation Comparative Example 4.

The XRD patterns of $CeO_2$, $Ce_{0.75}Zr_{0.25}O_2$, $Ce_{0.50}Zr_{0.50}O_2$, $Ce_{0.25}Zr_{0.75}O_2$ and $ZrO_2$ used as supports in the catalyst precursors shown in Tables 8 and 9 are shown in FIG. 8. On the basis of this drawing, only $ZrO_2$ was determined to be a monoclinic crystal, while the other supports were determined to have a hexagonal fluorite structure. In those supports that contained Ce and Zr, a single fluorite structure was observed, and the peaks shifted to a higher angle as the amount of Zr increased. On the basis thereof, it was clearly determined that $Ce^{4+}$ sites of $CeO_2$ were substituted with $Zr^{4+}$ resulting in contraction of lattice size, or in other words, complex oxides of Ce and Zr were formed.

Figure 9:
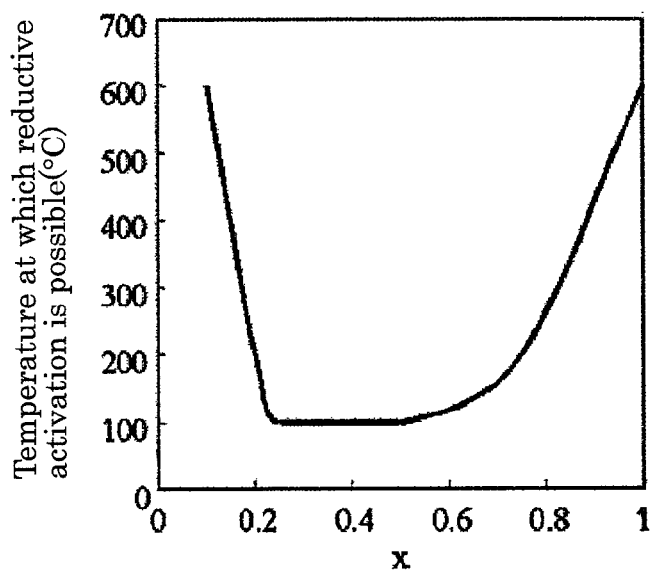
FIG. 9 shows temperatures at which reductive activation with $Rh/Ce_xZr_{1-x}O_2$ is possible.

According to Tables 8 and 9, those catalyst precursors loaded with Rh that contained a complex oxide of Ce and Zr or a complex oxide of Ce, Zr and Y were clearly determined to demonstrate activity in the vicinity of room temperature following the reductive activation at a temperature of 100° C. or 200° C. that was much lower than the case of using Catalyst Precursor Preparation Example 6 (1 wt % Rh/$CeO_2$). In the case of using only $ZrO_2$ for the support, activity was not demonstrated following the reductive activation at 800° C., thus indicating that complexing of Ce and Zr, or Ce, Zr and Y had a considerable effect on driving of the reaction. In the case of complex oxides containing Ce and Zr, or Ce, Zr and Y, the mobility of lattice oxygen increases at low temperatures, and this was presumed to have resulted in the formation of oxygen vacancies due to hydrogen treatment at extremely low temperatures, as well as rapid oxidation in the vicinity of normal temperatures. Furthermore, introduction of Y is presumed to contribute to improved stability of the catalyst at high temperatures. On the basis of these results, the temperatures at which oxidative reduction with Rh/$Ce_xZr_{1-x}O_2$ is possible are presumed to be as shown in FIG. 9. In addition, when a study was conducted with respect to the type of active metal, activity was clearly determined to be demonstrated in the vicinity of normal temperatures by catalyst precursors not only loaded with Rh, but also those loaded with another precious metal (Pt) or a base metal (Ni or Co).

Moreover, with the catalysts of Catalyst Precursor Preparation Examples 7, 8, 9, 12 and 13, the reaction was stopped by switching the reaction gas to Ar, and activity was demonstrated when the flow of reaction gas was restored after adjusting the catalyst layer temperature to 50° C. in the presence of flowing Ar without repeating reduction by $H_2$. Since reducing gases in the form of CO and $H_2$ are formed and the catalyst layer temperature is high at 450° C. or higher in direct heat supply reforming reactions, the supports contained in these catalysts are reduced resulting in the formation of oxygen vacancies. Consequently, the supports are presumed to have been rapidly oxidized in the vicinity of normal temperature at the start of the reaction resulting in the generation of heat, and the reaction was therefore able to be driven in the vicinity of normal temperatures without having to repeat reduction of the catalyst.

Reaction Example 27

Reaction Example 27 was carried out using Catalyst Precursor Preparation Example 3 in accordance with Reaction Example 1. A U-shaped quartz reaction tube was used. The reductive activation temperature was set to 800° C. After cooling the catalyst layer to room temperature in Ar following the reductive activation, activity was measured with the reaction tube immersed in an ice bath, by feeding reaction gas (catalyst layer temperature at the start of activity measurement: 0° C., molar ratio of n-$C_4H_{10}$/$O_2$/$N_2$/Ar=1/2/1/7, total gas feed rate: 407 mL/min, and spatial velocity (GHSV): 122 L/hr·g). The catalyst layer became red hot from the moment the reaction gas was supplied and the reaction was determined to be driven by the heat. The predicted experiment results are shown in Table 10.

TABLE 10

| Reaction example | Catalyst precursor | Reductive activation temp. (° C.) | Catalyst layer inlet temp. (° C.) Start of reaction | Catalyst layer inlet temp. (° C.) After 30 min | n-$C_4H_{10}$ conversion rate after 30 min (%) |
|---|---|---|---|---|---|
| 27 | Catalyst Precursor Preparation Example 3 | 800 | 0 | 500° C. or higher | 50% or more |

The catalyst layer became red hot as indicated above, and the reaction was determined to be driven even at 0° C.

Reaction Examples 28 to 33

Reactions were carried out using Catalyst Precursor Preparation Example 3 in accordance with Reaction Example 1. Temperature changes within the catalyst layer were measured by using a quartz reaction tube and inserting a thermocouple into the catalyst layer. The reductive activation temperature was set to 600° C. In addition, aluminum balls (Nikkato Corp., diameter: 1 mm) were adequately filled in front of and behind the catalyst layer. Under so-called pseudo-adiabatic conditions established by wrapping the reaction tube in Kao-Wool (Isolite Insulating Products) after cooling to room temperature in the presence of flowing Ar, to inhibit loss of heat generated in the reaction, activity was measured (catalyst layer temperature at the start of activity measurement: 32° C., molar ratio of n-$C_4H_{10}$/$O_2$/$N_2$/Ar=1/2/1/7, total gas feed rate: 407 mL/min, and spatial velocity (GHSV): 122 L/hr·g). The results of this Reaction Example 28 are shown in Table 11.

The reaction was stopped by switching the reaction gas to Ar after carrying out the reaction for 30 minutes. After the catalyst layer temperature had fallen to room temperature, Reaction Example 29 was carried out under the same conditions as those following the reductive activation (catalyst layer temperature at start of activity measurement: 38° C.). Reaction Examples 30 to 33 were subsequently carried out by repeating the procedure of reacting for 30 minutes, cooling in Ar and reacting starting from room temperature. The results are shown in Table 11.

TABLE 11

| Reaction example | Catalyst precursor | Reductive activation temp. (° C.) | Catalyst layer inlet temp. (° C.) Start of reaction | Catalyst layer inlet temp. (° C.) After 30 min | n-$C_4H_{10}$ conversion rate after 30 min (%) |
|---|---|---|---|---|---|
| 28 | Catalyst Precursor Preparation Example 3 | 600 | 32 | 872 | 96.6 |
| 29 | Catalyst Precursor Preparation Example 3 | | 38 | 875 | 91.9 |
| 30 | Catalyst Precursor Preparation Example 3 | | 37 | 867 | 93.8 |
| 31 | Catalyst Precursor Preparation Example 3 | | 37 | 876 | 91.7 |
| 32 | Catalyst Precursor Preparation Example 3 | | 36 | 867 | 91.5 |
| 33 | Catalyst Precursor Preparation Example 3 | | 33 | 862 | 91.6 |

Figure 10:
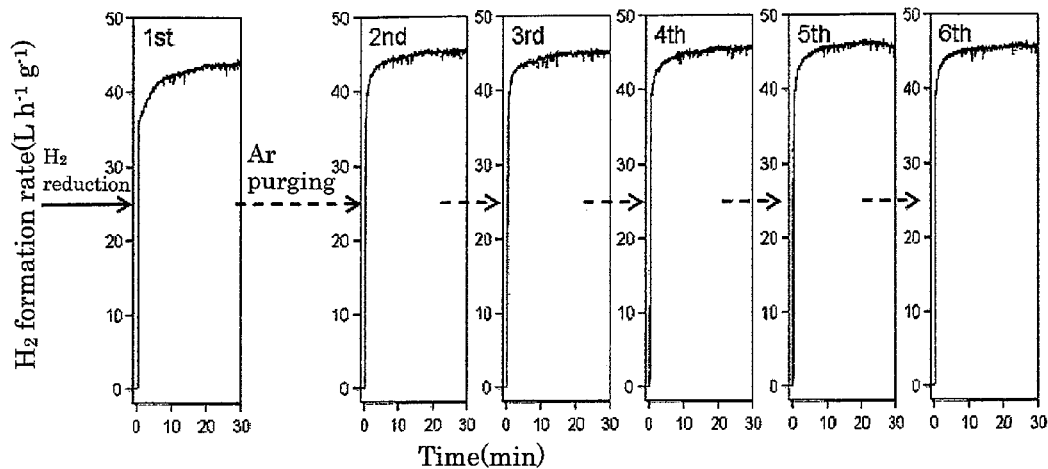
FIG. 10 shows hydrogen formation rates of Catalyst Precursor Preparation Example 3 following reduction treatment at 600° C. (pseudo-adiabatic reaction conditions) (Reaction Examples 28 to 33).
Figure 11:
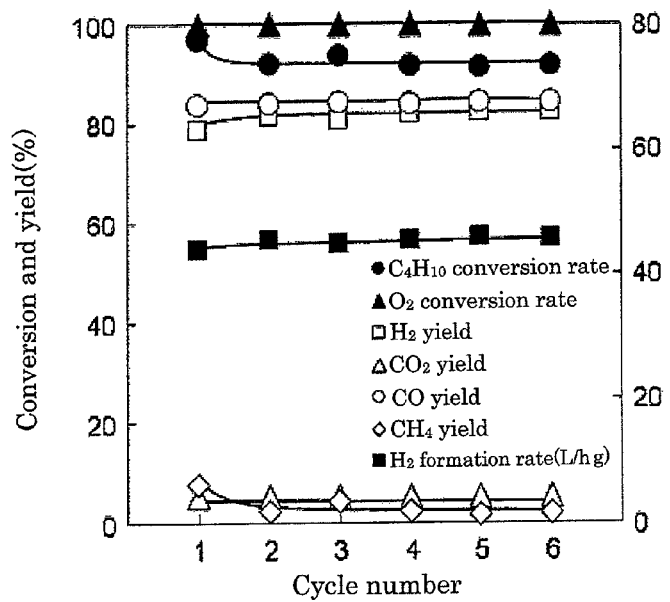
FIG. 11 shows conversion rates, yields and hydrogen formation rates of Catalyst Precursor Preparation Example 3 following reduction treatment at 600° C. (pseudo-adiabatic reaction conditions) (Reaction Examples 28 to 33).

As shown in FIG. 10, hydrogen was observed to be formed rapidly in Reaction Example 28 when the reaction gas was passed over the catalyst, and the reaction was determined to have been driven at room temperature. In Reaction Examples 29 to 33, the reaction was stopped by switching the reaction gas to Ar, and activity was demonstrated when the flow of reaction gas was restored after cooling the catalyst layer to room temperature in the presence of flowing Ar without repeating the reduction by $H_2$. This can also be readily understood from the conversion rates, yields and hydrogen generation rates shown in FIG. 11. In direct heat supply reforming reactions, reducing gases in the form of CO and $H_2$ are formed, the catalyst layer temperature reaches 850° C. or higher as a result of reaction under pseudo-adiabatic conditions and $CeO_2$ is reduced resulting in the formation of oxygen vacancies. Consequently, supports are presumed to have been rapidly oxidized in the vicinity of normal temperature at the start of the reaction resulting in the generation of heat, and the reaction was therefore presumed to have been able to be driven in the vicinity of normal temperatures without having to repeat the reduction of the catalyst. In addition, high n-$C_4H_{10}$ conversion rates were able to be obtained due to the high catalyst layer temperatures. On the basis of these results, carrying out the reaction under pseudo-adiabatic conditions or adiabatic conditions is presumed to have inhibited heat loss while also bringing about improvement in the degree of reduction of the support as well as an increase in the catalyst layer temperature during oxidation, thereby making this effective for repeatedly driving the reaction starting from normal temperatures.

INDUSTRIAL APPLICABILITY

Hydrogen production by hydrocarbon reforming has had the problem of the temperature for driving the reaction being 200° C. or higher due to being unable to realize a self-sufficient on-site reforming fuel cell system that does not require energy to be supplied from the outside. In contrast, the present invention provides a method for driving hydrogen production reactions at normal temperatures, and contributes to the realization of hydrogen stations, fuel cell vehicles loaded with gasoline and the like by utilizing the heat and $H_2$ generated in these reactions, thereby having a large potential for future use.

The invention claimed is:

1. A method for producing a catalyst for hydrogen of hydrocarbon,
    wherein the catalyst is for reacting oxygen lattice defects introduced in a complex oxide with oxygen added in reaction gas containing hydrocarbon to generate heat, and to thereby heat the catalyst to a temperature for hydrogen reduction reaction of the hydrocarbon, and wherein a support for the catalyst is composed using a complex of Zr and Ce; and wherein the method comprises:
    a first step for calcining the support in an oxidizing atmosphere and at a prescribed temperature before or after loading Rh as an active metal to thereby obtain a complex oxide of Ce and Zr as a precursor,
    a second step for treating the precursor of complex oxide loading Rh in a reducing atmosphere at a prescribed temperature and for a prescribed amount of time to thereby introduce oxygen lattice defects into the complex oxide to activate the precursor, and to thereby produce an activated precursor in the form of Rh/$Ce_xZr_{1-x}O_2$, wherein x is from 0.25 to 0.75, and
    a third step for retaining the activated precursor Rh/$Ce_xZr_{1-x}O_2$ in an inert atmosphere.
2. The method according to claim 1, wherein the second step is carried out at an appropriate temperature lower than 200° C.

* * * * *